US010387010B2

(12) United States Patent
Wezorek et al.

(10) Patent No.: US 10,387,010 B2
(45) Date of Patent: Aug. 20, 2019

(54) METHOD OF COMPUTERIZED PRESENTATION OF A DOCUMENT SET VIEW FOR AUDITING INFORMATION AND MANAGING SETS OF MULTIPLE DOCUMENTS AND PAGES

(71) Applicant: BLUEBEAM, INC., Pasadena, CA (US)

(72) Inventors: Joseph W. Wezorek, Pasadena, CA (US); Elliot Chenault, Monrovia, CA (US)

(73) Assignee: Bluebeam, Inc., Pasadena, CA (US)

( * ) Notice: Subject to any disclaimer, the term of this patent is extended or adjusted under 35 U.S.C. 154(b) by 244 days.

(21) Appl. No.: 15/431,552

(22) Filed: Feb. 13, 2017

(65) Prior Publication Data
US 2017/0235705 A1    Aug. 17, 2017

Related U.S. Application Data

(60) Provisional application No. 62/294,431, filed on Feb. 12, 2016.

(51) Int. Cl.
*G06F 17/21* (2006.01)
*G06F 17/24* (2006.01)
(Continued)

(52) U.S. Cl.
CPC ........ *G06F 3/04842* (2013.01); *G06F 3/0483* (2013.01); *G06F 17/212* (2013.01);
(Continued)

(58) Field of Classification Search
CPC .. G06F 17/211; G06F 17/2765; G06F 3/0483; G06F 3/0482; G06F 17/30011; G06F 17/212; G06F 17/24; G06Q 10/10
See application file for complete search history.

(56) References Cited

U.S. PATENT DOCUMENTS 5,983,171 A   11/1999 Yokoyama
6,067,553 A    5/2000 Downs
(Continued)

FOREIGN PATENT DOCUMENTS

EP    0 426 593 A2   8/1991
WO   2001022284 A3   8/2002
WO   2005066834 A1   7/2005

OTHER PUBLICATIONS

Copenheaver, Blaine R., PCT Notification of Transmittal of the International Search Report and the Written Opinion of the International Searching Authority, or the Declaration, dated February 18, 2014.
(Continued)

*Primary Examiner* — Quoc A Tran
(74) *Attorney, Agent, or Firm* — Bookoff McAndrews, PLLC

(57) ABSTRACT

A method of computerized presentation of a document set view for auditing information of a set of documents. The method includes the initial step of receiving on a computer a selection of an original document. The original document has multiple pages with each of the pages of the original document having corresponding page content. A selection is received from the user of a first region a page of the original document. This process is repeated to retrieve a text string from all of the pages. An addendum document with multiple pages is received. A text string is retrieved from the pages of the addendum document without user intervention. A document set view is provided using the retrieved text stings and displayed for the user to update the associated information and thus allowing for the user to perform a data audit of the automated portion of the process.

12 Claims, 21 Drawing Sheets

(51) Int. Cl.
  *G06F 17/27* (2006.01)
  *G06Q 10/00* (2012.01)
  *G06Q 10/10* (2012.01)
  *G06F 3/0483* (2013.01)
  *G06F 3/0484* (2013.01)

(52) U.S. Cl.
  CPC ............ *G06Q 10/00* (2013.01); *G06F 17/24* (2013.01); *G06F 17/2765* (2013.01); *G06Q 10/10* (2013.01)

(56) References Cited

U.S. PATENT DOCUMENTS

| | | | |
|---|---|---|---|
| 6,308,179 | B1 | 10/2001 | Petersen et al. |
| 7,949,938 | B2 | 5/2011 | Champion et al. |
| 7,979,388 | B2 | 7/2011 | Khoury |
| 8,566,711 | B1 | 10/2013 | Srivastava |
| 8,996,350 | B1 * | 3/2015 | Dub .................. G06F 17/30011 704/1 |
| 9,588,971 | B2 | 3/2017 | Hartmann |
| 2002/0118379 | A1 | 8/2002 | Chakraborty |
| 2003/0042319 | A1 | 3/2003 | Moore |
| 2004/0177058 | A1 | 9/2004 | Carpentier et al. |
| 2007/0226204 | A1 | 9/2007 | Feldman |
| 2007/0300143 | A1 * | 12/2007 | Vanderport ......... G06F 17/2247 715/234 |
| 2008/0077850 | A1 | 3/2008 | Gauthier et al. |
| 2009/0187598 | A1 | 7/2009 | Vohariwatt et al. |
| 2010/0169299 | A1 | 7/2010 | Pollara |
| 2010/0185627 | A1 | 7/2010 | Se |
| 2011/0078552 | A1 | 3/2011 | Lumley et al. |
| 2012/0047090 | A1 | 2/2012 | Gunther |
| 2012/0084155 | A1 | 4/2012 | Roy et al. |
| 2013/0239230 | A1 | 9/2013 | Herbach et al. |
| 2014/0115436 | A1 * | 4/2014 | Beaver ................ G06F 17/2288 715/229 |
| 2015/0220520 | A1 | 8/2015 | Hartmann et al. |
| 2017/0131862 | A1 | 5/2017 | Hartmann |

OTHER PUBLICATIONS

European Patent Office, European Search Report and Opinion for Application No. 13873569.1, dated Sep. 23, 2016, 8 Pages.
Thomas, Shane, PCT Notification of Transmittal of the International Search Report and the Written Opnion of the International Searching Authority, or the Declaration, dated Apr. 15, 2015, pp. 1-9.
Copenheaver, Blaine R., PCT Notification of Transmittal of the International Search Report and the Written Opinion of the International Searching Authority, or the Declaration, dated May 10, 2017, pp. 1-9.

* cited by examiner

Tags

Select cells below to modify Tags

| File | Sheet Number | Sheet Name | Revision Number | Issue Date | Issue Description | Discipline |
|---|---|---|---|---|---|---|
| A100.pdf | A100 | Site Plan VCTC | 0 | 1/04/2016 | Bulletin 1 | Architectural |
| A200.pdf | A200 | Construction Plan | 0 | 2/15/2013 | Bulletin 1 | Architectural |
| A300.pdf | A300 | Construction Plan | 0 | 2/15/2013 | Bulletin 1 | Architectural |
| A301.pdf | A301 | Construction Plan | 0 | 2/15/2013 | Bulletin 1 | Architectural |
| A302.pdf | A302 | Construction Plan | 0 | 2/15/2013 | Bulletin 2 | Architectural |
| A303.pdf | A303 | Construction Plan | 0 | 5/23/2013 | Bulletin 2 | Architectural |
| A304.pdf | A304 | Construction Plan | 0 | 2/15/2013 | Bulletin 1 | Architectural |
| A305.pdf | A305 | Construction Plan | 0 | 2/15/2013 | Bulletin 1 | Architectural |
| A306.pdf | A306 | Construction Plan | 0 | 2/15/2013 | Bulletin 1 | Architectural |
| A307.pdf | A307 | Construction Plan | 0 | 2/15/2013 | Bulletin 1 | Architectural |
| E100.pdf | E100 | Lighting Plan | 0 | 2/15/2013 | Bulletin 1 | Electrical |
| E200.pdf | E200 | Lighting Plan | 0 | 2/15/2013 | Bulletin 1 | Electrical |
| E300.pdf | E300 | Lighting Plan | 0 | 2/15/2013 | Bulletin 1 | Electrical |
| E301.pdf | E301 | Lighting Plan | 0 | 2/15/2013 | Bulletin 1 | Electrical |
| E302.pdf | E302 | Lighting Plan | 0 | 2/15/2013 | Bulletin 1 | Electrical |
| E303.pdf | E303 | Lighting Plan | 0 | 2/15/2013 | Bulletin 1 | Electrical |
| E304.pdf | E304 | Lighting Plan | 0 | 5/23/2013 | Bulletin 2 | Electrical |

Delete Tag     OK     Cancel

FIG. 15

| File | Sheet Number | Sheet Name | Revision Number | Issue Date | Issue Description | Discipline |
|---|---|---|---|---|---|---|
| A100.pdf | A100 | Site Plan VCTC | 0 | 1/04/2016 | Bulletin 1 | Architectural |
| A200.pdf | A200 | Construction Plan | 0 | 2/15/2013 | Bulletin 1 | Architectural |
| A200.1.pdf | A200.1 | Construction Plan | 1 | 3/15/2013 | Bulletin 1 | Architectural |
| A300.pdf | A300 | Construction Plan | 0 | 2/15/2013 | Bulletin 1 | Architectural |
| A300.1.pdf | A300.1 | Construction Plan | 1 | 3/15/2013 | Bulletin 1 | Architectural |
| A301.pdf | A301 | Construction Plan | 0 | 2/15/2013 | Bulletin 1 | Architectural |
| A302.pdf | A302 | Construction Plan | 0 | 2/15/2013 | Bulletin 1 | Architectural |
| A303.pdf | A303 | Construction Plan | 0 | 5/23/2013 | Bulletin 2 | Architectural |
| A304.pdf | A304 | Construction Plan | 0 | 2/15/2013 | Bulletin 1 | Architectural |
| A305.pdf | A305 | Construction Plan | 0 | 2/15/2013 | Bulletin 1 | Architectural |
| A306.pdf | A306 | Construction Plan | 0 | 2/15/2013 | Bulletin 1 | Architectural |
| A307.pdf | A307 | Construction Plan | 0 | 2/15/2013 | Bulletin 1 | Architectural |
| E100.pdf | E100 | Lighting Plan | 0 | 2/15/2013 | Bulletin 1 | Electrical |
| E200.pdf | E200 | Lighting Plan | 0 | 2/15/2013 | Bulletin 1 | Electrical |
| E300.pdf | E300 | Lighting Plan | 0 | 2/15/2013 | Bulletin 1 | Electrical |
| E301.pdf | E301 | Lighting Plan | 0 | 2/15/2013 | Bulletin 1 | Electrical |
| E302.pdf | E302 | Lighting Plan | 0 | 2/15/2013 | Bulletin 1 | Electrical |

FIG. 19

METHOD OF COMPUTERIZED PRESENTATION OF A DOCUMENT SET VIEW FOR AUDITING INFORMATION AND MANAGING SETS OF MULTIPLE DOCUMENTS AND PAGES

CROSS-REFERENCE TO RELATED APPLICATIONS

This non-provisional patent application and claims priority to and the benefits of U.S. Provisional Patent Application Ser. No. 62/294,431, entitled DATA AUDIT DISPLAY FOR SELECTIVELY ARRANGING SETS OF MULTIPLE DOCUMENTS, filed on Feb. 12, 2016, the entire contents of which are herein incorporated by reference.

STATEMENT RE: FEDERALLY SPONSORED RESEARCH/DEVELOPMENT

Not Applicable

BACKGROUND

1. Technical Field

The present disclosure relates generally to document management, and more particularly to a method computerized presentation of a document set view for auditing information and managing sets of multiple documents and pages.

2. Related Art

The creation, distribution, and management of information are core functions of business. Information or content can be presented in a variety of different ways, including word processing documents, spreadsheets, graphics, photographs, engineering drawings, architectural plans, and so forth. In electronic form, these are generally referred to as documents, and may be generated and manipulated by computer software applications that are specific thereto. A typical workflow in the enterprise involves various personnel, oftentimes across disparate geographic locations, collaborating to create, review, and/or edit such documents.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Because of its versatility and universality, files in the PDF format are often preferred over more particularized file formats of specific applications.

Depending on workflow conventions that may be particular to a single business, or common amongst similar businesses or across an industry, document management can vary in complexity. The most basic practice is to store a single document in a single file on a hierarchical file system that is organized according to directories and subdirectories. This may be suitable for simple projects where there is a single document of minimal length, or where there are multiple documents, each are largely independent of the others and do not require concurrent review and/or revision. Some sharing may be possible to the extent the file system is connected to a network, such that different users are able to access the files from local or remote computers also connected to the network. In order to avoid applying conflicting changes, individual files are typically locked upon being opened, allowing access to only one user while all others are restricted.

Users in the Architecture, Engineering, and Construction (AEC) industry often work with very large PDF files. These can range from content-heavy architectural floorplans created from CAD programs to specification manuals of hundreds or thousands of pages. AEC users frequently reference many documents, and thus need to load the files as quickly as possible, and also easily navigate through their files to find the information they need. To decrease file load times, many users split their large files into smaller files with fewer pages or drawing sheets. Another benefit is that users can check out these files from a document management system without blocking others from editing the rest of the document, since they are no longer a single file. However, splitting files apart makes them more difficult to navigate than a single file. In addition, these navigation concerns are compounded where various pages or drawing sheets undergo iterations of revisions and are superseded by those corresponding pages of various addendum documents. Nevertheless, it is desirable in some cases to view the entire collection of files making up or related to a single document or multiple documents in a project all at once as a cohesive whole.

Existing solutions require that all of the pertinent files be opened concurrently in order for the document to be viewed and navigated as a whole, largely negating the advantages of maintaining separate files for each document page or document segment. Other solutions may utilize matching of file names or page labels for organizational purposes, which often required users to edit their standard naming conventions in order to use this functionality. Furthermore, tracking each of the addendums and presenting the most recent version along with the remainder of the document or documents is not possible unless the files are particularly named with proper revision numbers and the older files are designated as outdated or otherwise identified. This process is prone to error because the modifications must be made manually on a page by page process, and document checkout procedures may prohibit such modifications.

Accordingly, there is a need in the art for a method for managing, auditing and selectively arranging sets of multiple documents and pages within documents.

BRIEF SUMMARY

The present invention contemplates a method of computerized presentation of a document set view for auditing information and managing sets of multiple documents and pages. The documents at least include an original document and an addendum document. In general, the method provides for an automated detection of information of the pages and corresponding revisions to such pages while allowing the user to audit this automated aspect before saving the detected information.

The method includes the initial step of receiving on a computer a selection of an original document. The original document has multiple pages with each of the pages of the original document having corresponding page content. The method continues with the step of receiving, from a user, a selection of a first region within a first one of the pages of the original document. The first region is defined by a set of first boundaries relative to the page content of first one of the pages of the original document and including a first base selection page content. The method continues with the step of retrieving, without user intervention, a text string of the first base selection page content from the first one of the pages of the original document.

The method continues with the step of assigning, without user intervention, the retrieved text string of the first base selection page content to a page location index of the first one of the pages of the original document. The method continues with the step of retrieving, without user intervention, a text string of a first replicated selection page content from a second one of the pages of the original document. The first replicated selection page content is included in the same first region defined by the set of first boundaries relative to the page content of second one of the pages of the original document. The method continues with the step of assigning, without user intervention, the retrieved text string of the first replicated selection page content to a page location index of the second one of the pages of the original document. The method continues with the step of receiving on the computer a selection of an addendum document, the addendum document having multiple pages. Each of the pages of the addendum document has corresponding page content. At least one of the pages of the addendum document is respectively correlated to a page of the original document. The method continues with the step of retrieving, without user intervention, a text string of an addendum replicated selection page content from each page of the addendum document. The addendum replicated selection page content is included in the same first region defined by the set of first boundaries relative to each page of the addendum document. The method continues with the step of assigning, without user intervention, the retrieved text string of the addendum replicated selection page content to a page location index of each page of the addendum document.

The method continues with the step of generating a document set using the original document and the addendum document. The method continues with the step of displaying on a computer a document set view from the document set, the document set view being generated from document set information based upon the page location index of each page of the original document and the addendum document. The method continues with the step of receiving, from the user, updated information corresponding to a portion of the document set information displayed on the document set view. The method continues with the step of updating the page location index of each page of the original document and the addendum document corresponding to the received updated information.

According to various embodiments of the present invention, the text string of the first base selection page content may correspond to a page number and the text string of the addendum replicated selection page content may correspond to a page number. The displaying of the document set view may include sorting the document set view based upon one of alphanumeric and numeric values of the page location index of the pages of the original document and the addendum document. The retrieving of the text string of the first base selection page content may be via detection of embedded data from the first one of the pages of the original document. The retrieving of the text string of the first base selection page content may be via optical character recognition (OCR).

In addition according to other embodiments, the method may further include the step of receiving, from a user, a selection of a second region within a first one of the pages of the original document. The second region may be defined by a set of second boundaries relative to the first one of the pages of the original document and including a second base selection page content. The method may further include the step of retrieving, without user intervention, a text string of the second base selection page content from the first one of the pages of the original document. The method may further include the step of assigning, without user intervention, the retrieved text string of the first base selection page content to a page location index of the first one of the pages of the original document. The method may further include the step of retrieving, without user intervention, a text string of a second replicated selection page content from a second one of the pages of the original document. The second replicated selection page content may be included in the same second region defined by the set of second boundaries relative to the second one of the pages of the original document. The method may further include the step of assigning, without user intervention, the retrieved text string of the second replicated selection page content to a page location index of the second one of the pages of the original document. The text string of the second base selection page content may correspond to a page name.

In yet further embodiments, the displaying of the document set view may include sorting the document set view based upon one of alphanumeric and numeric values of the page location index of the pages of the original document and the addendum document. The displaying of the document set view is in tabular form. The displaying of the document set view may include sorting the document set view based upon one of alphanumeric and numeric values of the page location index of the pages of the original document and the addendum document. The method may include the step of retrieving, without user intervention, a text string from all pages of the original document using same first region defined by the set of first boundaries relative to the page content of each of the pages of the original document.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 15 is a dialog window for displaying a document set view associated with the original document;

FIG. 19 is a dialog window for displaying a document set view associated with the original document and the addendum document;

Common reference numerals are used throughout the drawings and the detailed description to indicate the same elements.

DETAILED DESCRIPTION

The detailed description set forth below in connection with the appended drawings is intended as a description of the presently preferred embodiment of a method of computerized presentation of a document set view for auditing information and managing sets of multiple documents. It is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
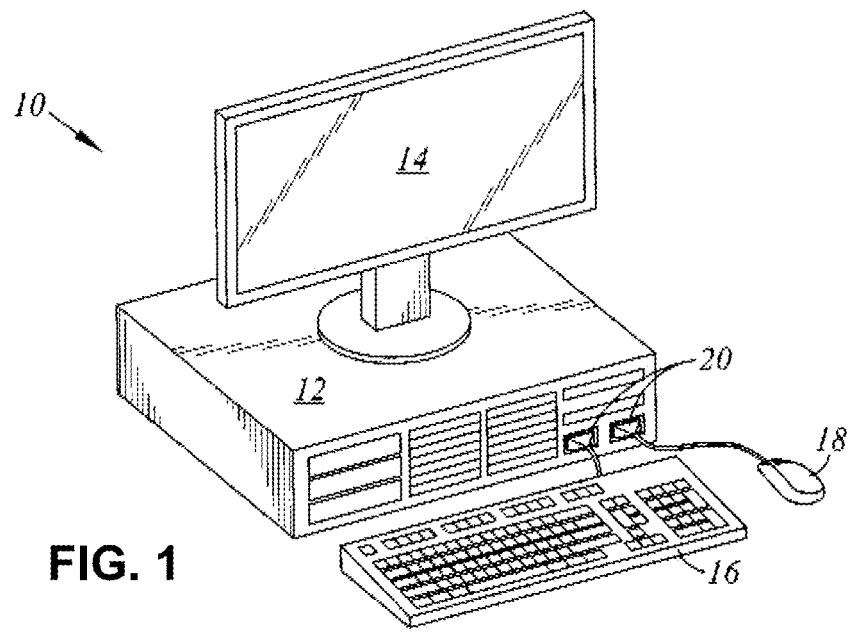
FIG. 1 is an exemplary computer system that may be capable to perform functions for use with aspects of the present invention including a display monitor.

FIG. 1 depicts an exemplary hardware environment in which various aspects of the contemplated method of presentation of a document set view for document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
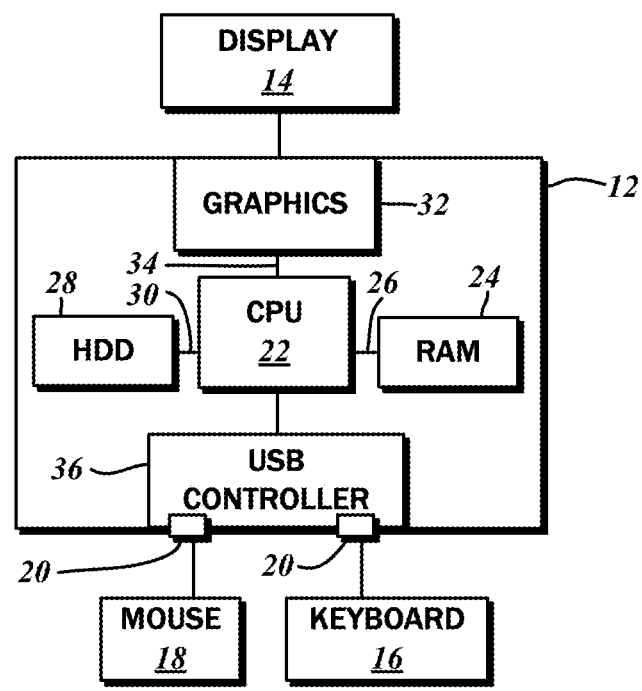
FIG. 2 is a block diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A dedicated graphics module 32 may also connected to the CPU 22 via a video bus 34, and transmits signals representative of display data to the display device 14. As indicated above, the keyboard 16 and the mouse 18 are connected to the system unit 12 over the port 20. In the embodiments where the port 20 is a USB type, there may be a USB controller 36 that translates data and instructions to and from the CPU 22 for the external peripherals connected via the port 20 or wirelessly connected such a via Bluetooth connectivity. Additional devices such as printers, microphones, speakers, and the like may be connected to the system unit 12 thereby.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display device 14. Generally, the operating system and the computer programs are tangibly embodied in a computer-readable medium, e.g., the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the computer system 10, and specifically with the graphics being generated on the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10.

Although certain features of the present disclosure are described in relation to a computer system with such input and output capabilities, specifics thereof are presented by way of example only and not of limitation. Any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

The present disclosure involves a process of sorting and displaying information of multiple pages or drawing sheets across multiple documents in a single view and allowing for a user to intuitively audit such information. As utilized herein, the term document refers to standalone representation of data that can be opened, rendered and/or edited by a document reviewing software application. Accordingly, the document may be formatted and structured in a particular way so that its elements can be rendered consistently. In the exemplary embodiment discussed herein, the document reviewing software application handles PDF documents, and the following description will be in reference thereto. Documents in any other format that are editable or viewable with any other software application may be substituted. It is understood that a document may include a single or multiple computer files, and each of such files may include one or more pages or drawing sheets.

Typically, documents and their associated files are stored in a hierarchical file system of the hard drive 28 or any other accessible storage device. In the context of the present disclosure, it is possible for a single document to be stored across multiple files. Thus, reference to a file is not necessarily interchangeable with a document. Although storage of documents on the file system would be the simplest since such feature exists by default in almost any computer operating system, it is also possible to implement various aspects of the present disclosure within a comprehensive document management system application that is layered above the operating system/file system with local and/or remote components.

Again, the present invention contemplates a method of computerized presentation of a document set view for auditing information and managing sets of multiple documents and pages. The documents at least include an original document and an addendum document. In general, the method provides for an automated detection of information of the pages and corresponding revisions to such pages while allowing the user to audit this automated aspect before saving the detected information. The present invention is discussed in the context of method steps, some of which are optional and represent various embodiment or variation of the invention. In this regard, reference is made to the flowchart that extends from FIG. 20 to FIG. 22. The method will now be discussed in the context of an exemplary user interface for a document reviewing software application that implements various aspects of the contemplated by the present invention.

Figure 3:
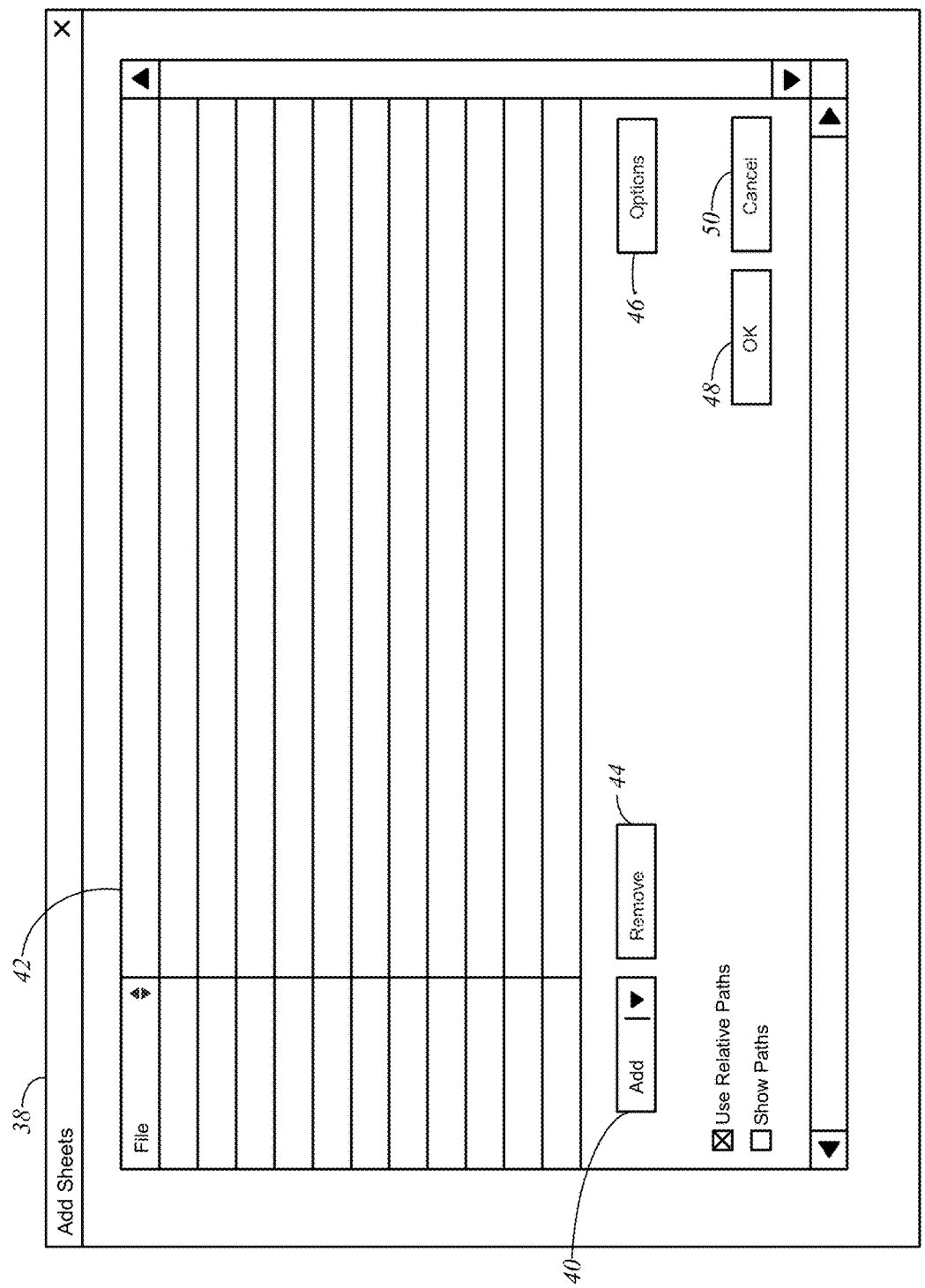
FIG. 3 is a dialog window of a user interface for a document reviewing software application that implements various aspects of the contemplated by the present invention with the dialog window for initiating inclusion of documents for review.

Referring now to FIG. 3 there is depicted a dialog window 38 that is used to initiate the processes for creating sets of documents and the display of related information for auditing by the user in accordance with aspects of the present invention. The dialog window 38 includes an add button 40 that is used invoke access to a conventional file system for adding documents sheets or pages of documents by providing file selection tools. Once files are selected, it is contemplated that such selected documents may be represented by a display of information of associated computer files in the display window 42, such as by displaying of the related file names and any other desired information. A remove button 44 may be used to remove any such selected files. An options button 46 may provide further controls, such as related to file filtering, file sorting, file naming conventions, and so forth. An OK button 48 initiates a continuation of the process and is may be used to signal to the system that the user is done this adding any additional files. A cancel button 50 is provided to ceases the process.

Figure 4:
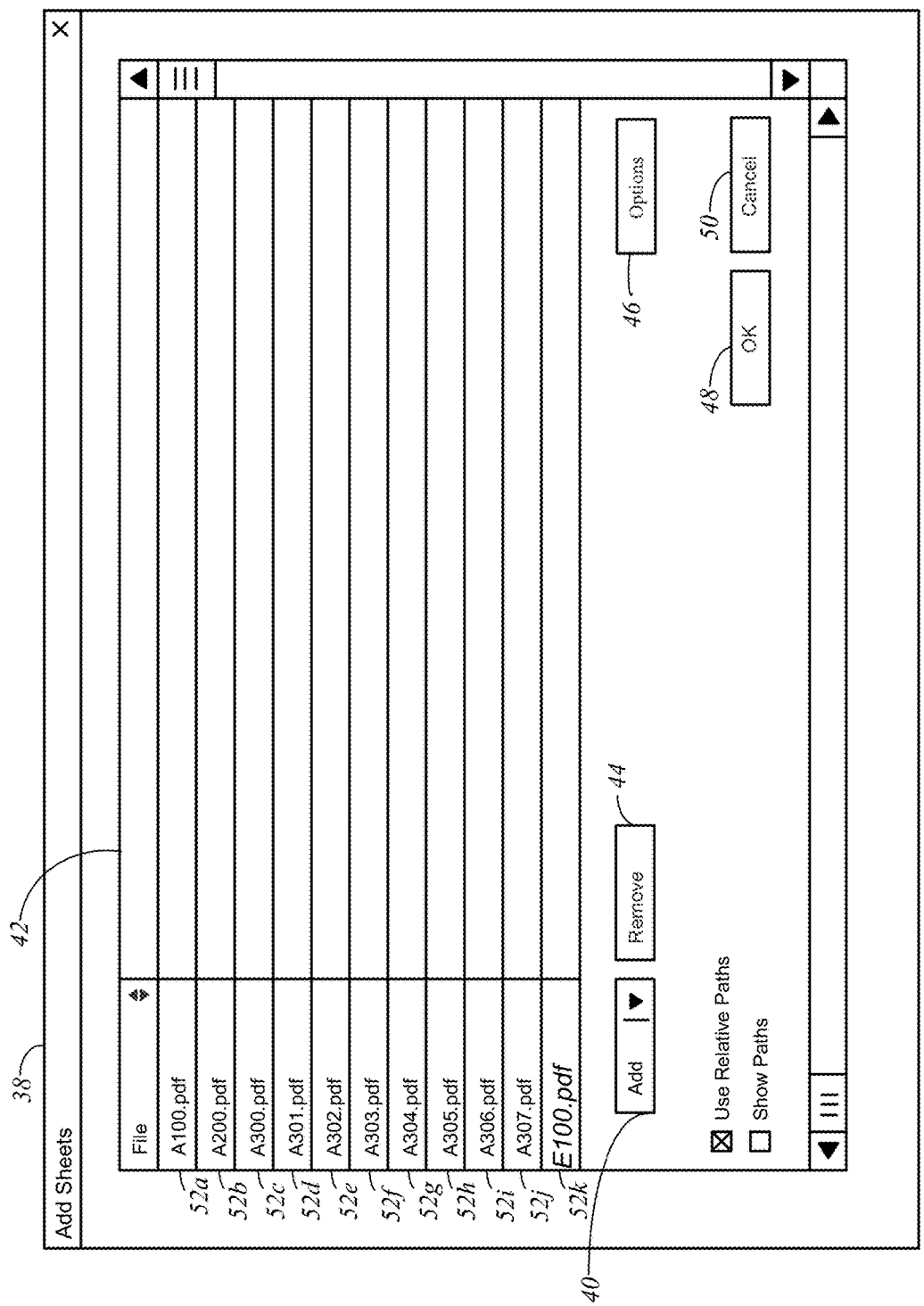
FIG. 4 is the dialog window of FIG. 3 indicating the inclusion of an original document.
Figure 20:
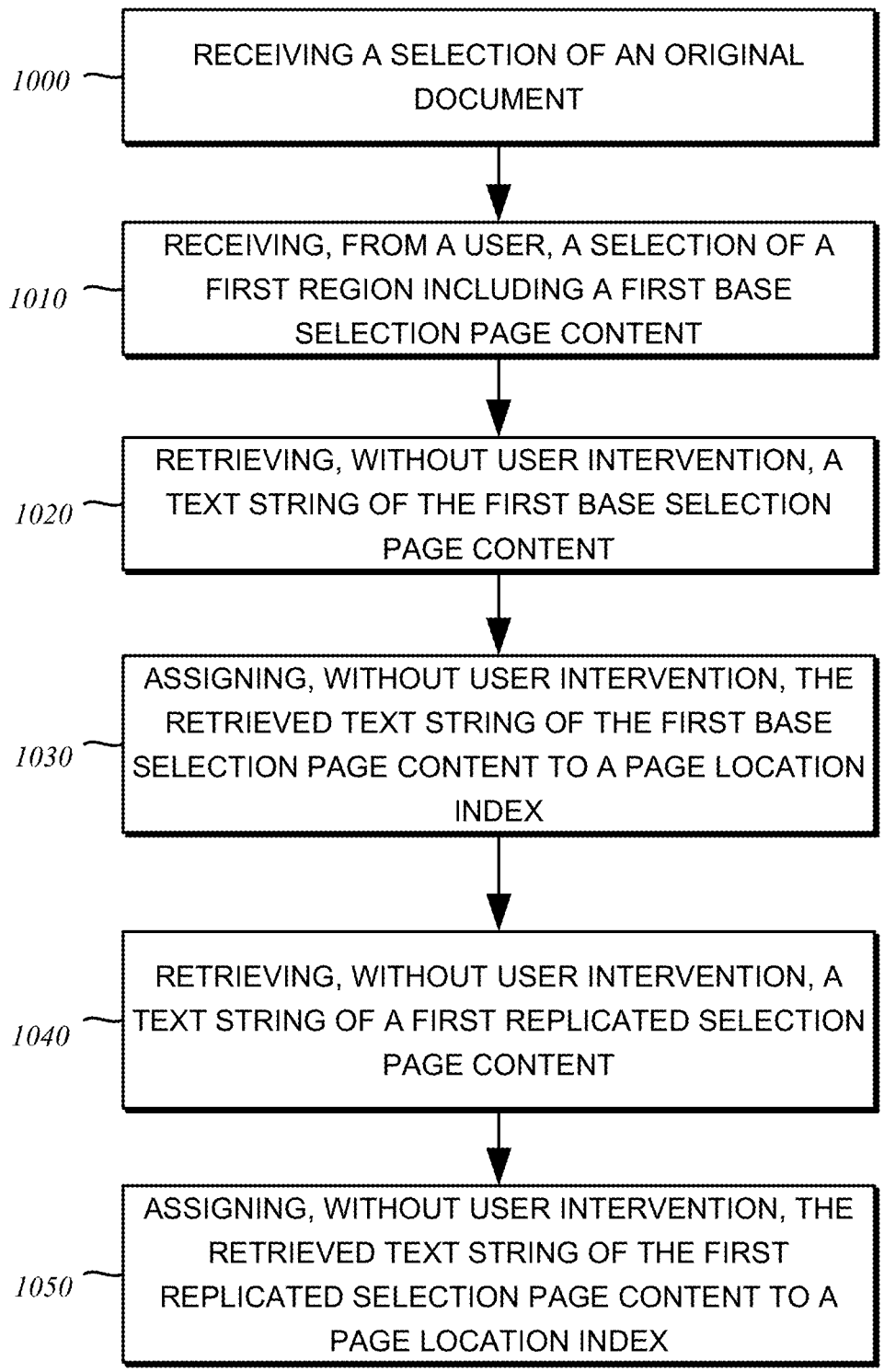
FIG. 20 is a flowchart depicting one embodiment of the method of computerized presentation of a document set view.

With reference to FIG. 20, the method begins with a step 1000 of receiving on a computer, such as computer system 10, a selection of an original document. Referring now to FIG. 4 there is the dialog window 38 of FIG. 3 indicating the inclusion of the original document 54 as represented by files 52*a-k* (with others not displayed in the display window 42 but understood to be selected as well).

Figure 5:
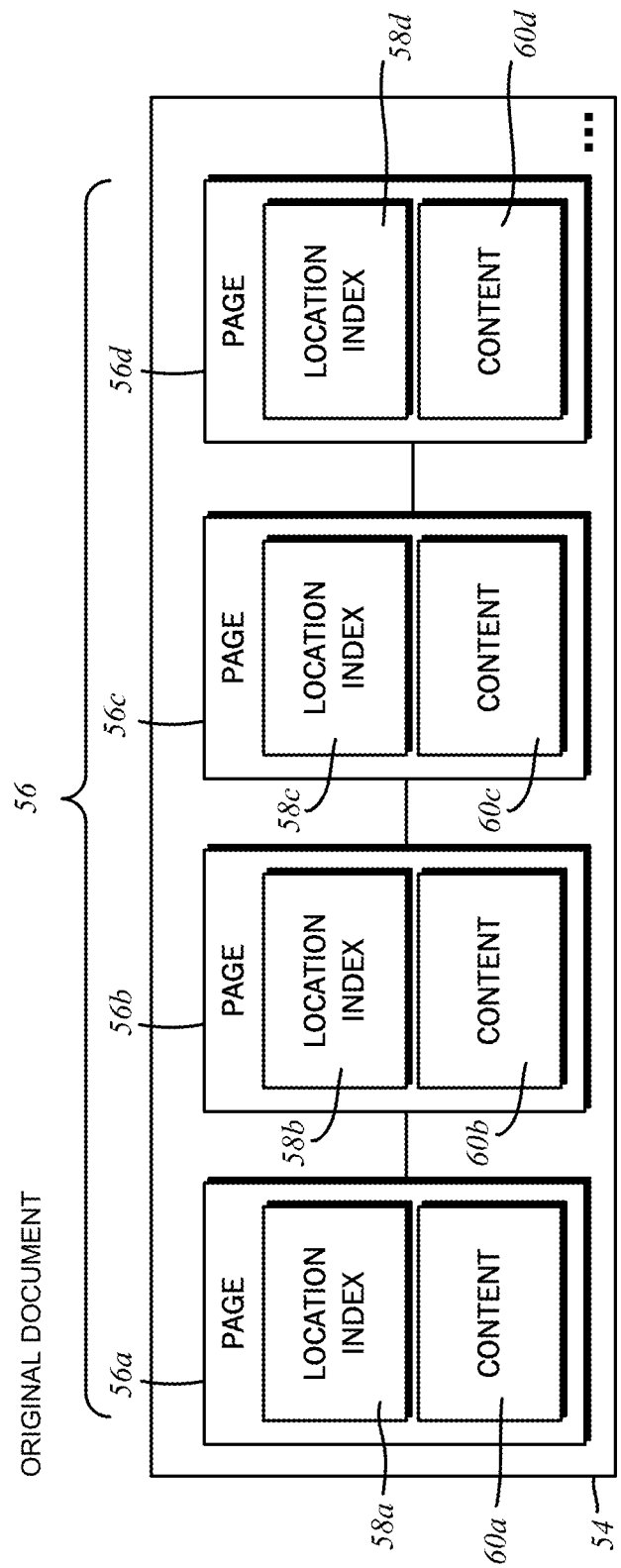
FIG. 5 is a diagram showing an exemplary structure of the original document including multiple pages each with content and a location index.

With reference to the symbolic diagram of FIG. 5, according to various embodiments of the present disclosure, the original document 54 is comprised of one or more pages 56. In the particular example, there is a first page 56*a*, a second page 56*b*, a third page 56*c*, and a fourth page 56*d*. There are additional pages 56, though these are not specifically depicted in the diagram. In this regard, the original document 54 is contemplated to have multiple pages of any quantity. Each of the pages 56 has an associated page location index 58 (individually denoted 58*a-d*) and page content 60 (individually denoted 60*a-d*), and is ordered according to a numerical page number value or alphanumeric value. When the original document 54 is rendered within a user interface of the document management software application, the page content 60 within the respective pages 56 may be presented in the order defined by the numerical page number value or alphanumeric. Such original document 54 may be stored in the various files on a hierarchical file system of the hard drive 28 or any other accessible storage device. As discussed above, the original document may take the form of a single file or multiple file and the pages corresponding to a single file or multiple files. In this case each page 56 corresponds to a respective single file with the collection corresponding to the original document 54. In this example, file 52*a* corresponds to page 56*a*, and file 52*b* corresponds to page 56*b*, and so forth, with all of them being associated with the original document 54. This is the more common organization in architectural, engineering, and construction (AEC) technical settings. For example, one page or drawing sheet may contain the base structure of a given area, while another document may contain the electrical wiring diagrams of the same area. Yet another page may contain the HVAC diagrams of the same area. With engineering projects, one document may contain drawings of an entire assembly, with other documents containing detailed views of components of the assembly. While the collection may be generally referred to as a single document, individual pages may be saved as individual files.

As such individual files are relatively small compared to that of an entire project, file load times and storage requirements are favorable. This is also conducive to checking out files from a document management system. However, a myriad of files can be quite unwieldly for a user to intuitively navigate through such collection of drawing sheets residing in such separate files. The present invention facilitates ease of sorting the files. This is accomplished through a partially automated process that allows for the user to audit such automated generated information prior to committing the information to be associated with such files, pages and documents.

Figure 6:
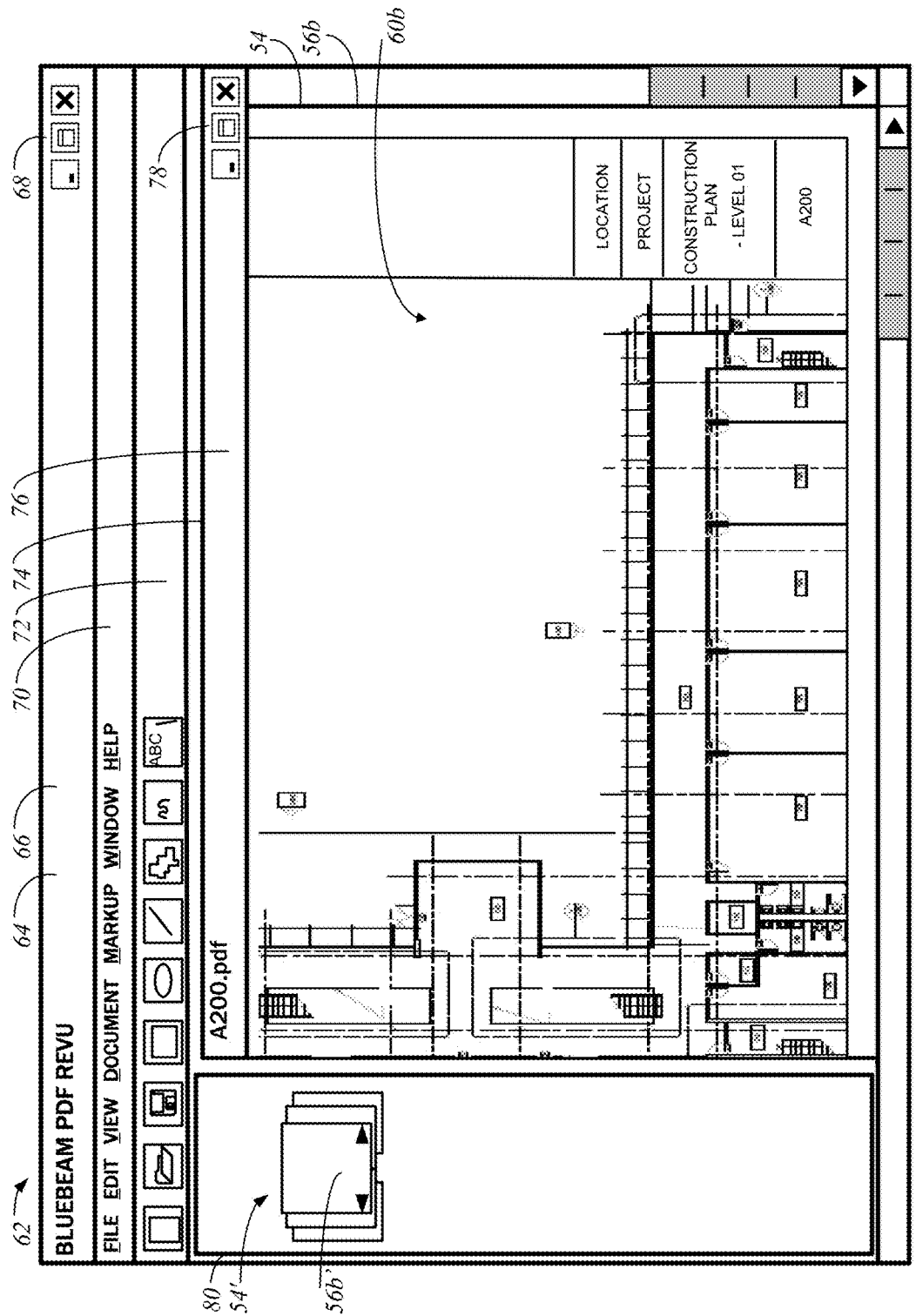
FIG. 6 is an exemplary user interface of a document reviewing software application that implements various aspects of the contemplated method for the presentation of a plurality of documents.

Referring now to FIG. 6 there is depicted an exemplary graphical user interface 62 of a document editing software application in which various embodiments of the method of the present disclosure may be implemented. The software application runs on a windowing system, and accordingly has a number of interface elements that are common to applications for the same. The functional, interactive features of the graphical user interface 62 are contained within a main window 64 that includes a title bar 66 with basic window controls 68 that variously minimize, maximize, and close the main window 64. In addition, the main window 64 includes a menu bar 70, from which various functions of the document reviewing software application may be invoked via activated pull-down menus. So that commonly utilized functions such as opening files, saving changes to the currently opened file, and so forth are readily accessible, there is also a tool bar 72. Within the main window 64 is a workspace window 74, which includes a sub-title bar 76 and the basic window controls 78. One or more of the aforementioned documents are rendered within the workspace window 74. Further, as the original document 54 includes multiple pages and corresponding files, the sub-title bar 76 depicts the annotation "A200.pdf" which corresponding to the file 52b and the page 56b. It is understood that only a portion of the page 56b is displayed, and in particular only the lower right corner being displayed in this view.

In order to aid in the navigation of documents and multiple pages thereof, there is a thumbnail sidebar 80 is also provided in the main window 64. A thumbnail 54' is a graphical representation of the selected original document 54. As the original document 54 includes multiple pages 56, the graphic of the thumbnail 54' appears as a stack of pages. The center portion 56b' of the graphic corresponding to the particular page being currently displayed in the workspace window 74—in this case the page 56b.

Figure 7:
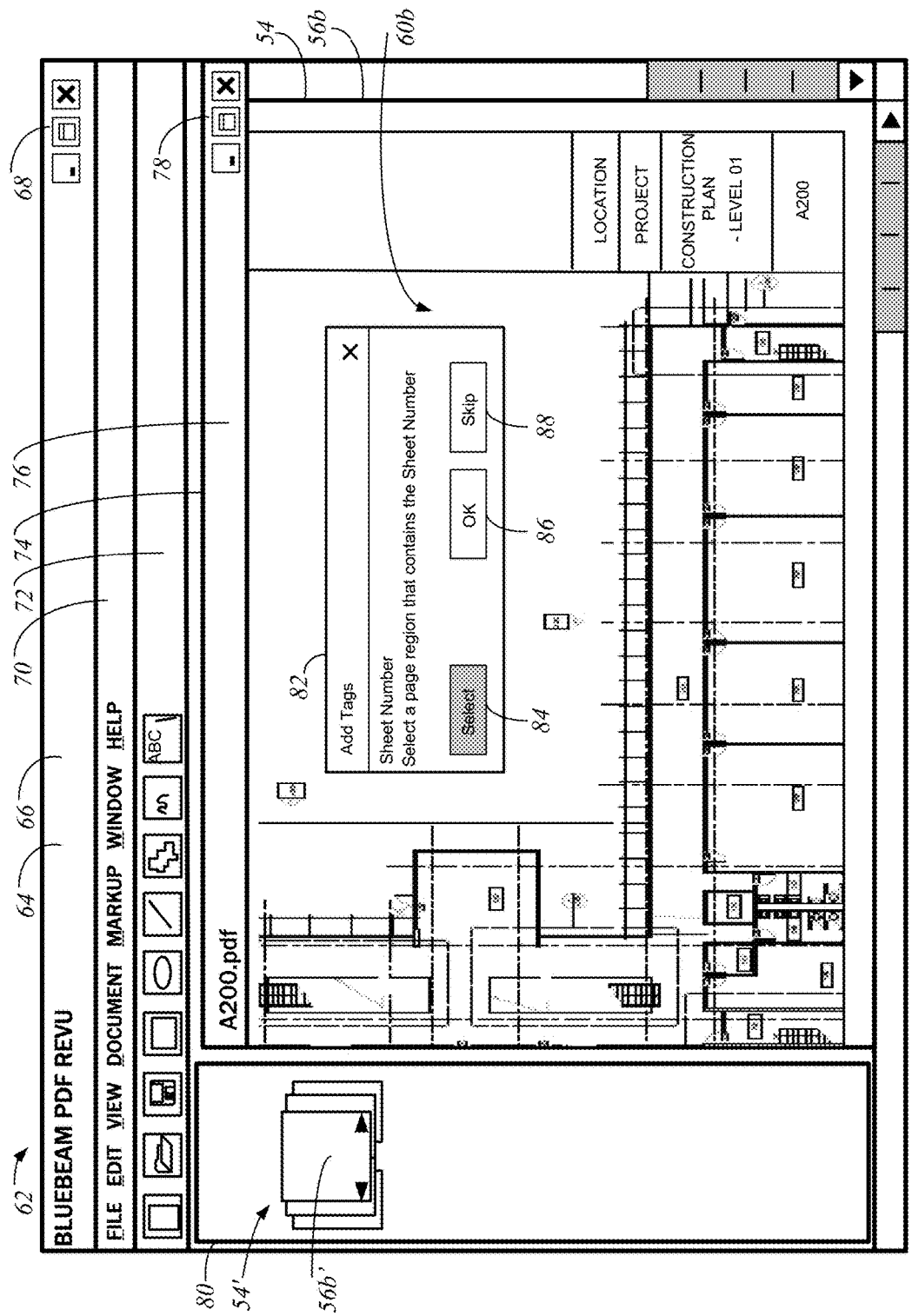
FIG. 7 is the exemplary user interface of FIG. 6 with a dialog window for initiating selection of a first region of a first page of the original document.

Referring now to FIG. 7, there is depicted the exemplary user interface of FIG. 6 with a dialog window for initiating selection of a first region of a first page of the original document. In this embodiment, such first region is contemplated to correspond to a page or sheet number. In this the architectural, engineering, and construction (AEC) industry there are various sheet or page numbering standards and conventions. A unique page identifier is expected to be associated with each given sheet or page in a document. Similarly, a given page or sheet would have a specific name. Management and navigation of management of documents would typically rely on such information. In the example of the page 56b, the page number appears at the lower right corner as "A200" and just above it appears the page name as "CONTSTRUCTION PLAN" with a sub-name of "LEVEL 01." As exemplified below, the method of the present invention may continue with providing an automated process for extracting such identifying information directly from the page content 60b.

A dialog window 82 is used to prompt the user to make a selection of a first region as discussed below. A select button 84 is used to proceed with the selection process. An OK button 86 initiates a continuation of the process and is may be used to signal to the system that the user is done making a selection. A skip button 88 is provided to inform the system that the user does not want to make any first region selection by nonetheless desires to continue with the overall process.

Figure 8:
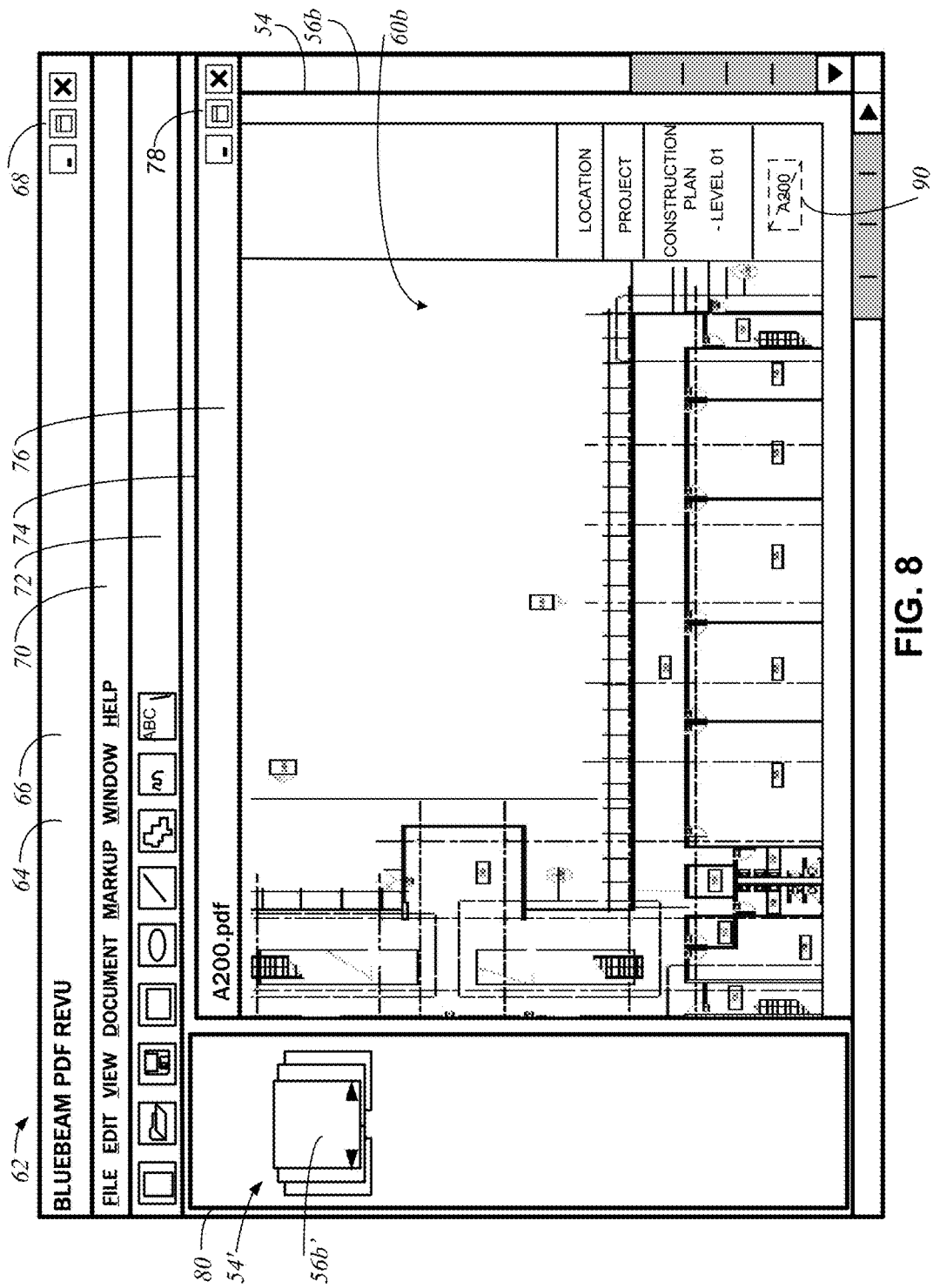
FIG. 8 is the exemplary user interface of FIG. 7 depicting the first region selected.
Figure 9:
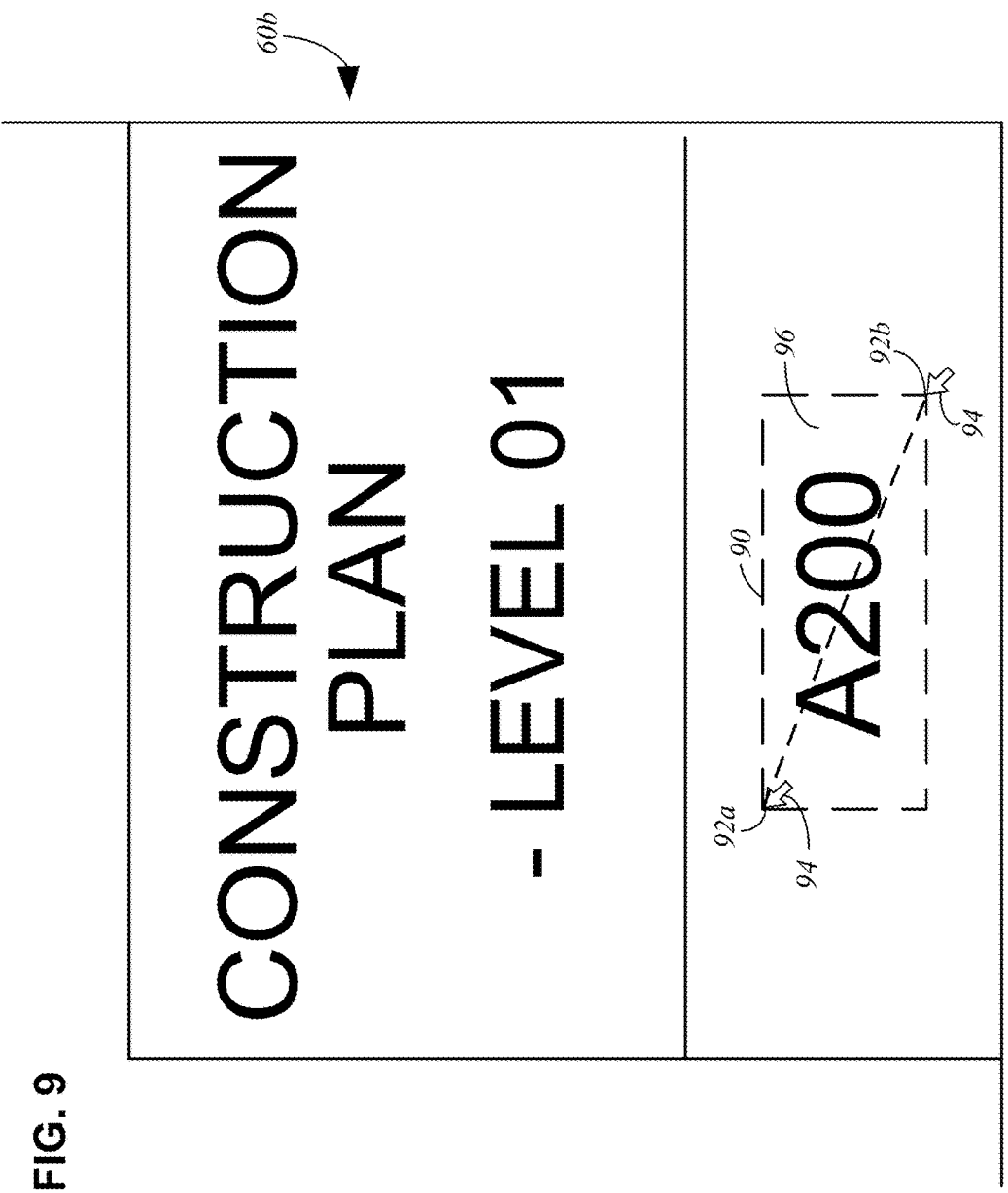
FIG. 9 is an enlarged portion of the exemplary user interface of FIG. 8 depicting the first region selected.

Referring now to the flowchart of FIG. 20, the method includes a step 1010 of receiving, from a user, a selection of a first region 90 within a first one of the pages of the original document 54, such as page 56b. This step 1010 may be initiated in response to detecting the activation of the select button 84 in the dialog window 82. The first region 90 is defined by a set of first boundaries relative to the page content 60b and including a first base selection page content 96. FIG. 8 depicts the exemplary user interface 62 of FIG. 7 depicting the first region 90 having been selected. As best shown in the enlarged view of the portion of the exemplary user interface 62 depicting the lower right corner of the page content 60b in FIG. 9, the first region 90 is defined by an upper left hand corner 92a and a diagonally opposed lower right hand corner 92b, and is therefore rectangular in shape. These boundaries are understood to be defined relative to the page 56b and its page content 60b. The first region 90, which encompasses the example text "A200", may be selected by positioning a mouse cursor 94 on the upper left hand corner 92a, clicking the mouse button, and dragging the mouse cursor 94 to the lower right hand corner 92b. In this regard, the selected content, e.g., the example text "A200" may also be referenced as the first base selection page content 96. Other ways for selecting a region on a graphical user interface 62 are known, and such alternatives are deemed to be within the scope of the present disclosure. For instance, a multi-segment polygon could be a basis for selecting the region by designating each polygon segment graphically. The method further includes a step 1020 of retrieving, without user intervention, a text string 100 of the first base selection page content from the page 56b of the original document 54. In this case, the text string 100 of "A200" is retrieved. The text string 100 may be retrieved via detection of embedded data from the page 56. To the extent that embedded data is not present it is contemplated that the text string may be retrieved through the use of optical character recognition (OCR) technology. Such retrieval is contemplated to be effectuated using any of those techniques which are well known to one of ordinary skill in the art.

Figure 10:
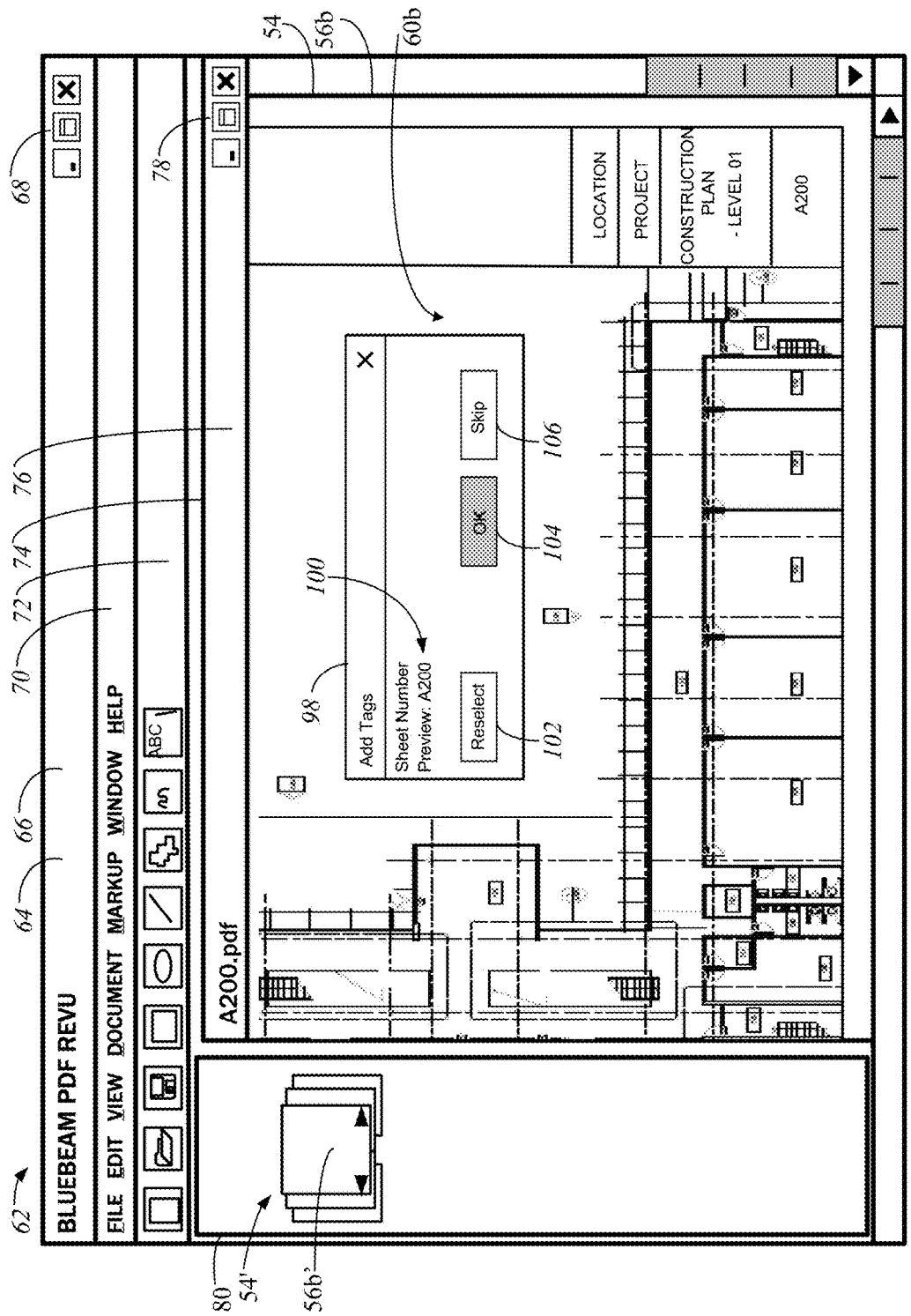
FIG. 10 is the exemplary user interface of FIG. 8 with a dialog window for previewing a text string associated with the selection of the first region.

Referring now to FIG. 10 there is the exemplary user interface of FIG. 8 with a dialog window 98 for previewing the text string 100 associated with the selection of the first region 90. There is provided a reselect button 102 that facilitates the user to discard the present selection of the first region 90 after having been provided with a preview of the text string. This would then allow the user to make another selection as described above. To the extent that the retrieved text string is acceptable to the user, the user may use an OK button 104 to proceed with the process. There is also a skip button 106 that would allow the user to discard the selection but nonetheless proceed with the process.

Having made the selection by actuating the OK button 104, the method includes a step 1030 of assigning, without user intervention, the retrieved text string 100 of the first base selection page content 96 to the page location index 58b of the page 56b of the original document 54. The method includes a step 1040 of retrieving, without user intervention, a text string of a first replicated selection page content from a second one of the pages of the original document 54, such as page 56. The first replicated selection page content being included in the same first region 90 defined by the set of first boundaries relative to the page content 60 of second one of the pages of the original document 54. The method includes a step 1050 of assigning, without user intervention, the retrieved text string of the first replicated selection page content to a page location index 58 of the second one of the pages of the original document 54. In this regard, the process is contemplated to be repeated for all of the pages 56 of the original document 54. It is contemplated that this automates the collection of the selected page content, in this case the content corresponding the specific page numbers of the various pages 56 of the original document 54. At the same time the user is able to very precisely define that physical dimensioning and location from where to pull such data.

Figure 11:
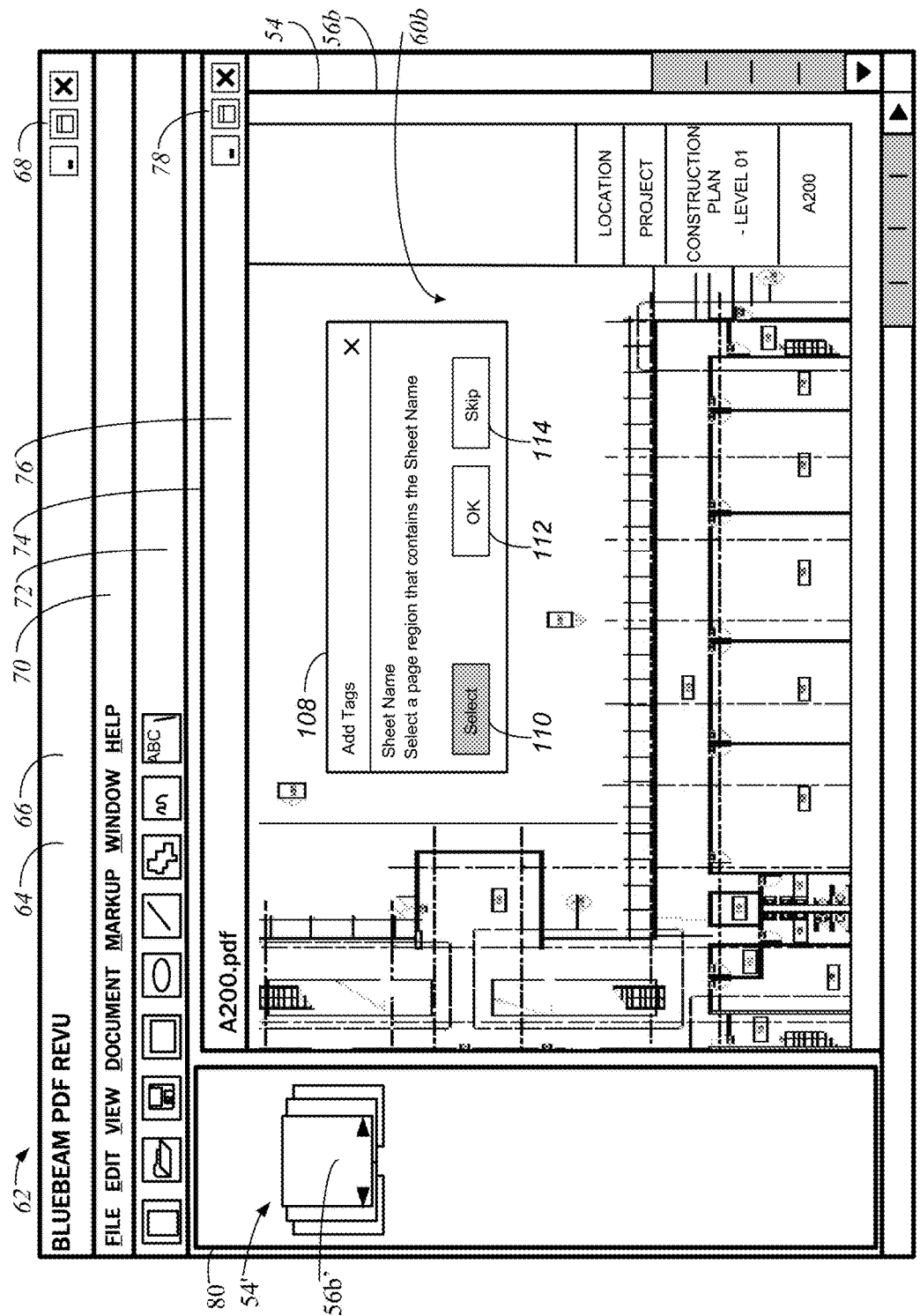
FIG. 11 is the exemplary user interface of FIG. 6 with a dialog window for initiating selection of a second region of the first page of the original document.

Referring now to FIG. 11, there is depicted the exemplary user interface of FIG. 10 with a dialog window 108 for initiating selection of a second region of the first page of the original document. In this embodiment, such second region is contemplated to correspond to a page or sheet name. A dialog window 108 is used to prompt the user to make a selection of a second region as discussed below. A select button 110 is used to proceed with the selection process. An OK button 112 initiates a continuation of the process and is may be used to signal to the system that the user is done making a selection. A skip button 114 is provided to inform the system that the user does not want to make any first region selection by nonetheless desires to continue with the overall process.

Figure 12:
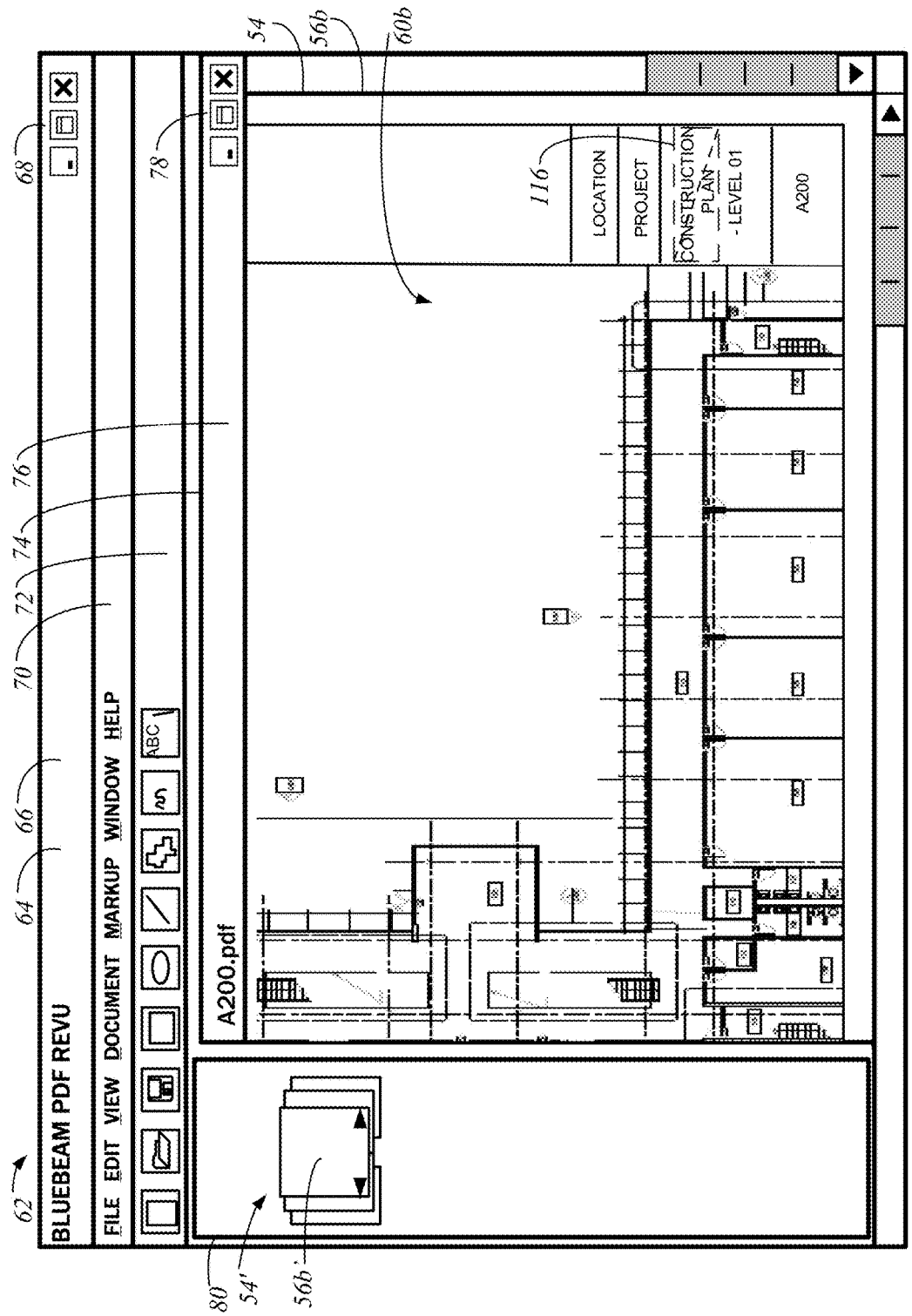
FIG. 12 is the exemplary user interface of FIG. 11 depicting the second region selected.
Figure 13:
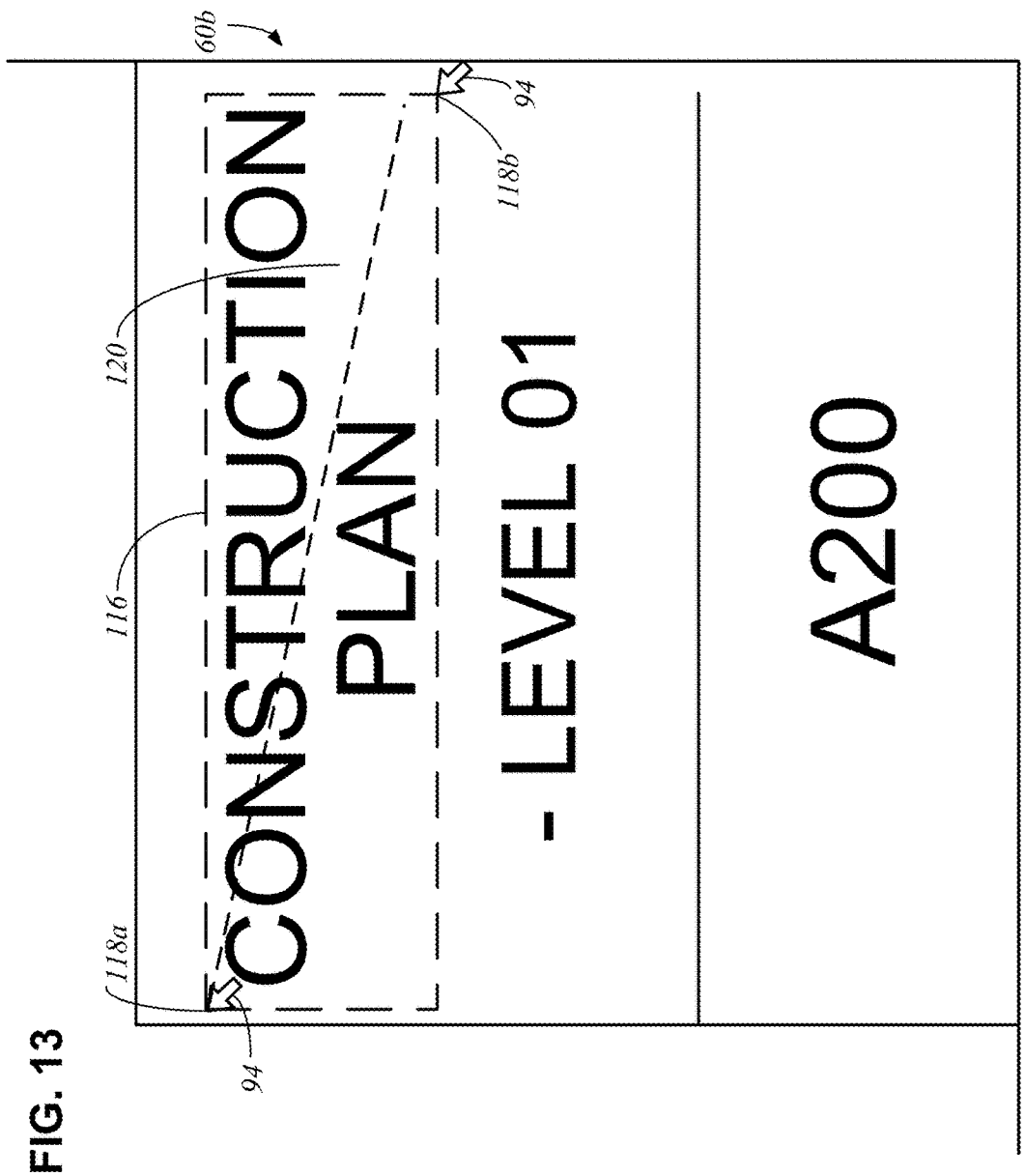
FIG. 13 is an enlarged portion of the exemplary user interface of FIG. 12 depicting the first region selected.
Figure 21:
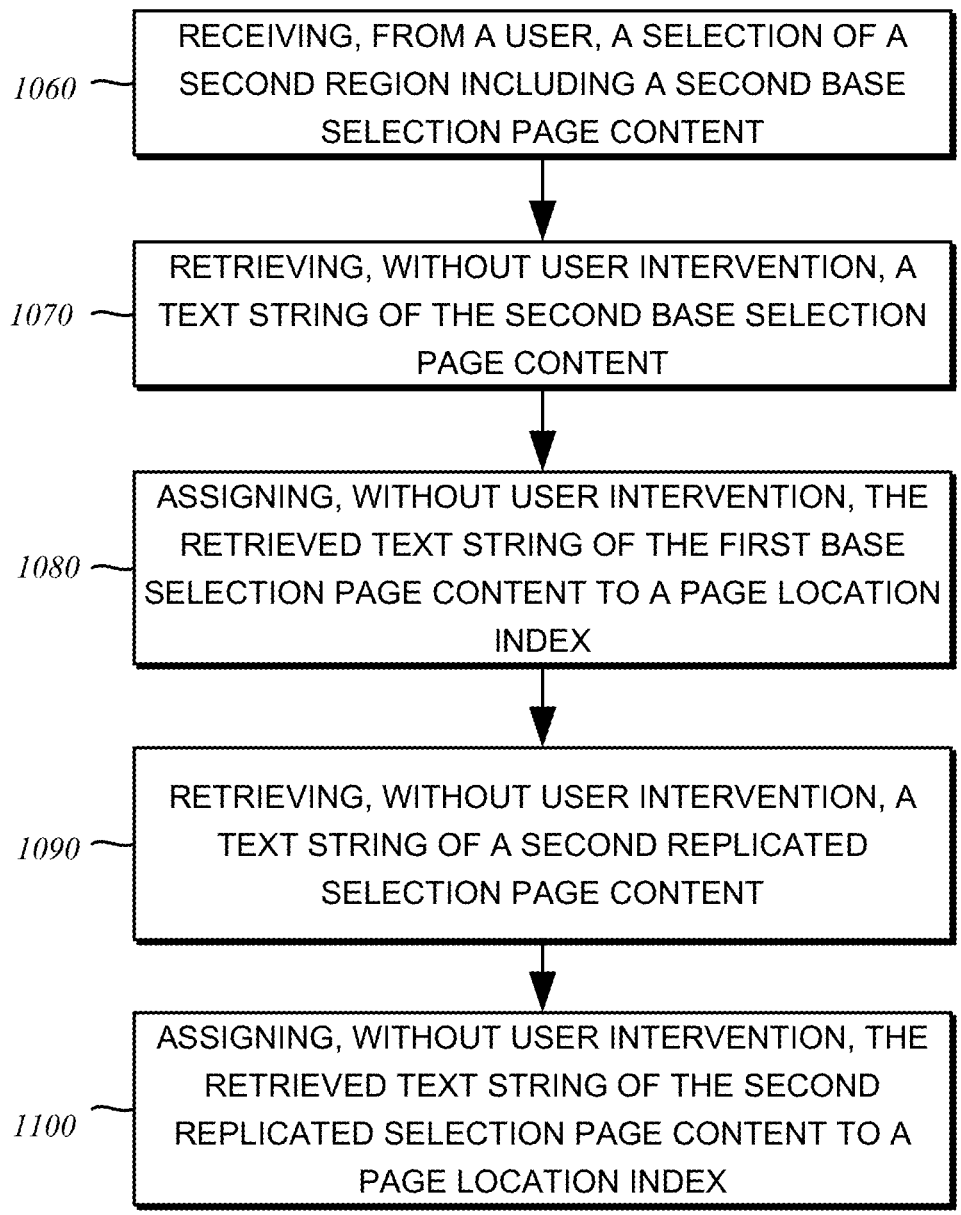
FIG. 21 is a continuation of the flowchart of FIG. 20.

Referring now to the flowchart of FIG. 21, the method may include a step 1060 of receiving, from a user, a selection of a second region 116 within a first one of the pages of the original document 54, such as page 56b. This step 1060 may be initiated in response to detecting the activation of the OK button 104 in the dialog window 98. The second region 116 is defined by a set of first boundaries relative to the page content 60b and including a second base selection page content 120. FIG. 12 depicts the exemplary user interface 62 of FIG. 11 depicting the second region 116 having been selected. As best shown in the enlarged view of the portion of the exemplary user interface 62 depicting the lower right corner of the page content 60b in FIG. 13, the second region 116 is defined by an upper left hand corner 118a and a diagonally opposed lower right hand corner 118b, and is therefore rectangular in shape. These boundaries are understood to be defined relative to the page 56b and its page content 60b. The second region 116, which encompasses the example text "CONSTRUCTION PLAN", may be selected by positioning a mouse cursor 94 on the upper left hand corner 118a, clicking the mouse button, and dragging the mouse cursor 94 to the lower right hand corner 118b. In this regard, the selected content, e.g., the example text "CONSTRUCTION PLAN" may also be referenced as the second base selection page content 120. The method further includes the step 1070 of retrieving, without user intervention, the text string 124 of the second base selection page content 120 from the page 56b.

Figure 14:
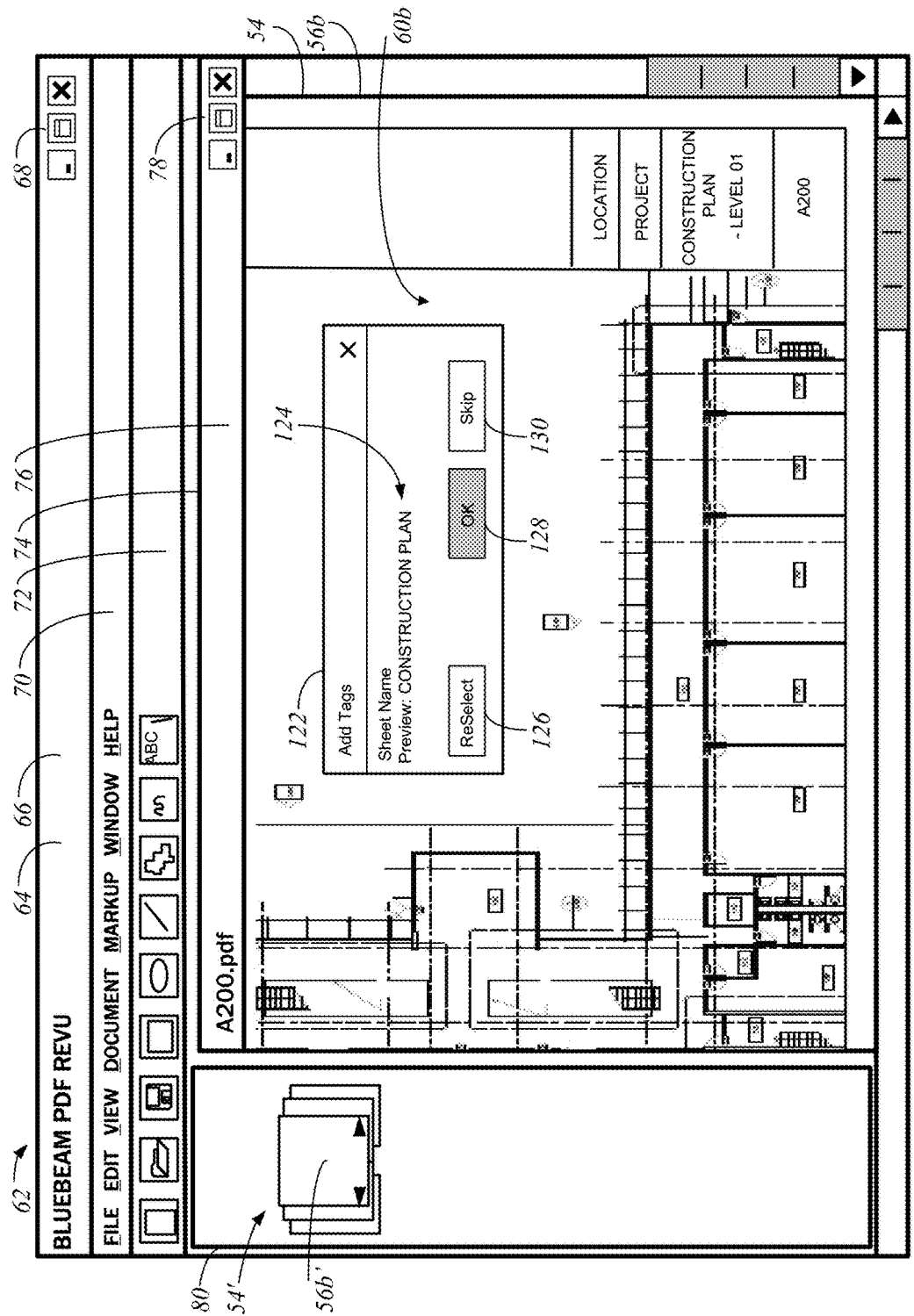
FIG. 14 is the exemplary user interface of FIG. 12 with a dialog window for previewing a text string associated with the selection of the second region.

Referring now to FIG. 14 there is the exemplary user interface of FIG. 12 with a dialog window 122 for previewing the text string 124 associated with the selection of the second region 90. There is provided a reselect button 126 that facilitates the user to discard the present selection of the second region 116 after having been provided with a preview of the text string. This would then allow the user to make another selection as described above. To the extent that the retrieved text string is acceptable to the user, the user may use an OK button 128 to proceed with the process. There is also a skip button 130 that would allow the user to discard the selection but nonetheless proceed with the process.

Having made the selection by actuating the OK button 128, the method may include a step 1080 of assigning, without user intervention, the retrieved text string 124 of the second base selection page content 120 to the page location index 58b of the page 56b of the original document 54. The method may include the a step 1090 of retrieving, without user intervention, a text string of a second replicated selection page content from a second one of the pages of the original document 54. The second replicated selection page content being included in the same second region 116 defined by the set of second boundaries relative to the page 56b. The method includes a step 1100 of assigning, without user intervention, the retrieved text string of the second replicated selection page content to a page location index 58 of the second one of the pages of the original document 54. In this regard, the process is contemplated to be repeated for all of the pages 56 of the original document 54. It is contemplated that this automates the collection of the selected page content, in this case the content corresponding the specific page names of the various pages 56 of the original document 54. At the same time the user is able to very precisely define that physical dimensioning and location from where to pull such data. It is contemplated that a similar process may be implemented to retrieve any other data directly from the page content to be associated with the various pages 56 of the original document 54.

Referring now to FIG. 15 there is provided a dialog window 132 for displaying a document set view associated with the original document 54. In embodiment, the document set view is in a tabular format. The dialog window 132 includes a document set view window 134 for display of information of the pages 56 of the original document, and that of any other documents to be included as discussed below. The dialog window 132 includes a file header 136, a page number header 138, a page name header 140, a revision header 142, an issue date header 144, an issue description header 146, and a discipline header 148. The document set view window 134 includes a listing of all of those files 52 as previously received upon the step 1000 of receiving the selection of the original document 54. Document set information is used to populate the document set view window 134 as based upon the page location index of each page 56 of the original document 54. In this regard, the text string 100 and the text string 124 for page 56b and that of all text strings retrieved from the replicated selection page content of the various pages 56 is used to respectively populate the fields for the page number and page name. It is understood that the fields and associated headers 136, 138, 140, 142, 144, 146 and 148 may vary in number and type according to the desired information to be included or displayed in the document set view.

The dialog window 132 may include a data entry box 150. This may be used to enter data which may be used to fill or replace data in any of the displayed fields in the document set view window 134. The dialog window 132 may include a delete tag button 152 for use in deleting information in any of the various fields that may be selected in the document set view window 134. The dialog window 132 may include an OK button 154 for communicating to system to continue the process. The dialog window 132 may include a cancel button 156 for terminating the process.

Figure 16:
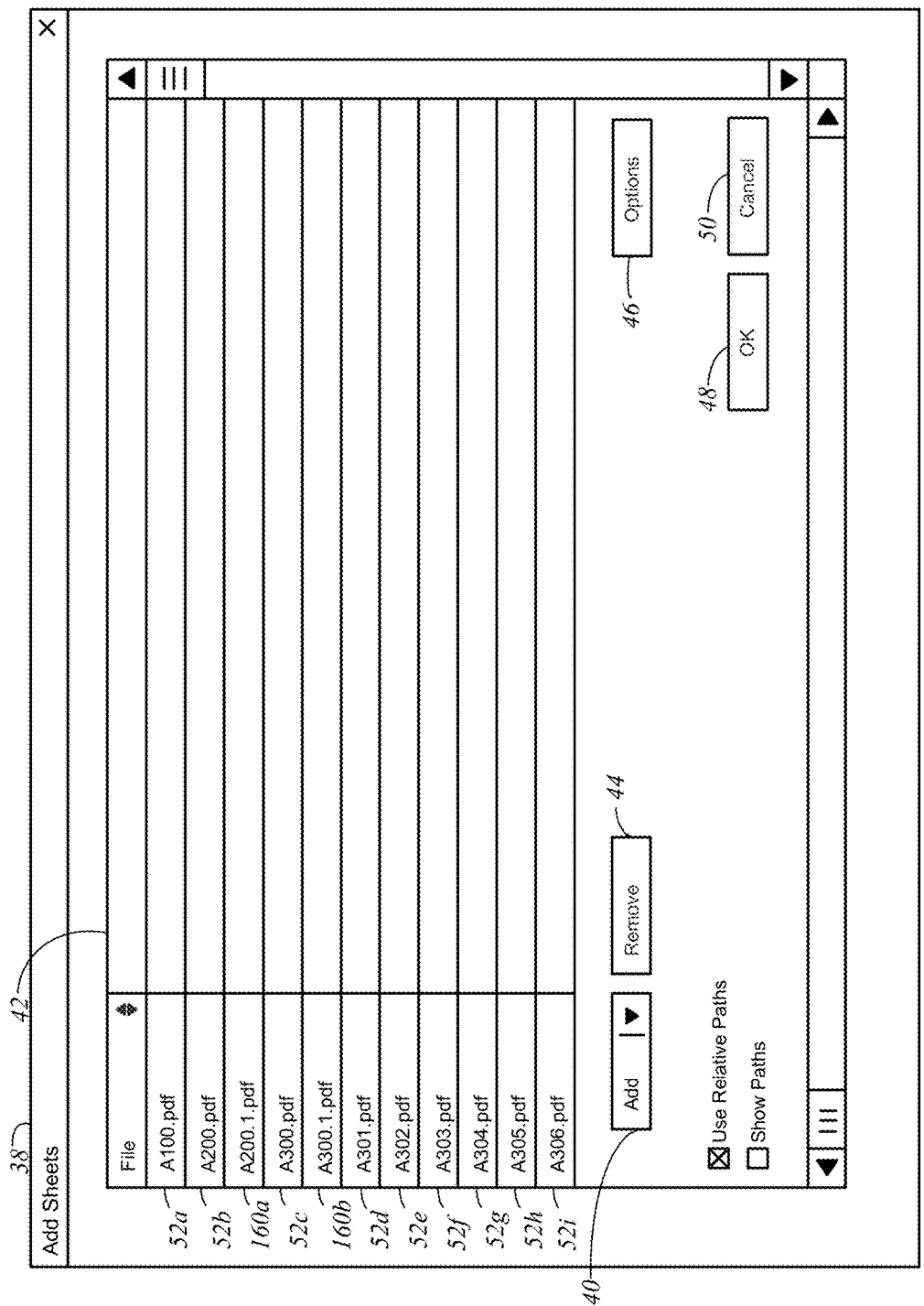
FIG. 16 is the dialog window of FIG. 4 indicating the inclusion of an addendum document along with the original document.

Referring now to FIG. 16 there is depicted the dialog window of FIG. 4 indicating the inclusion of an addendum document 158 as represented by files 160a and 160b along with the original document. In this depiction it is understood that not all of the files included in the original document 54 and the addendum document 158 are now display and may be displayed by scrolling down using the provided convention window tools.

Figure 17:
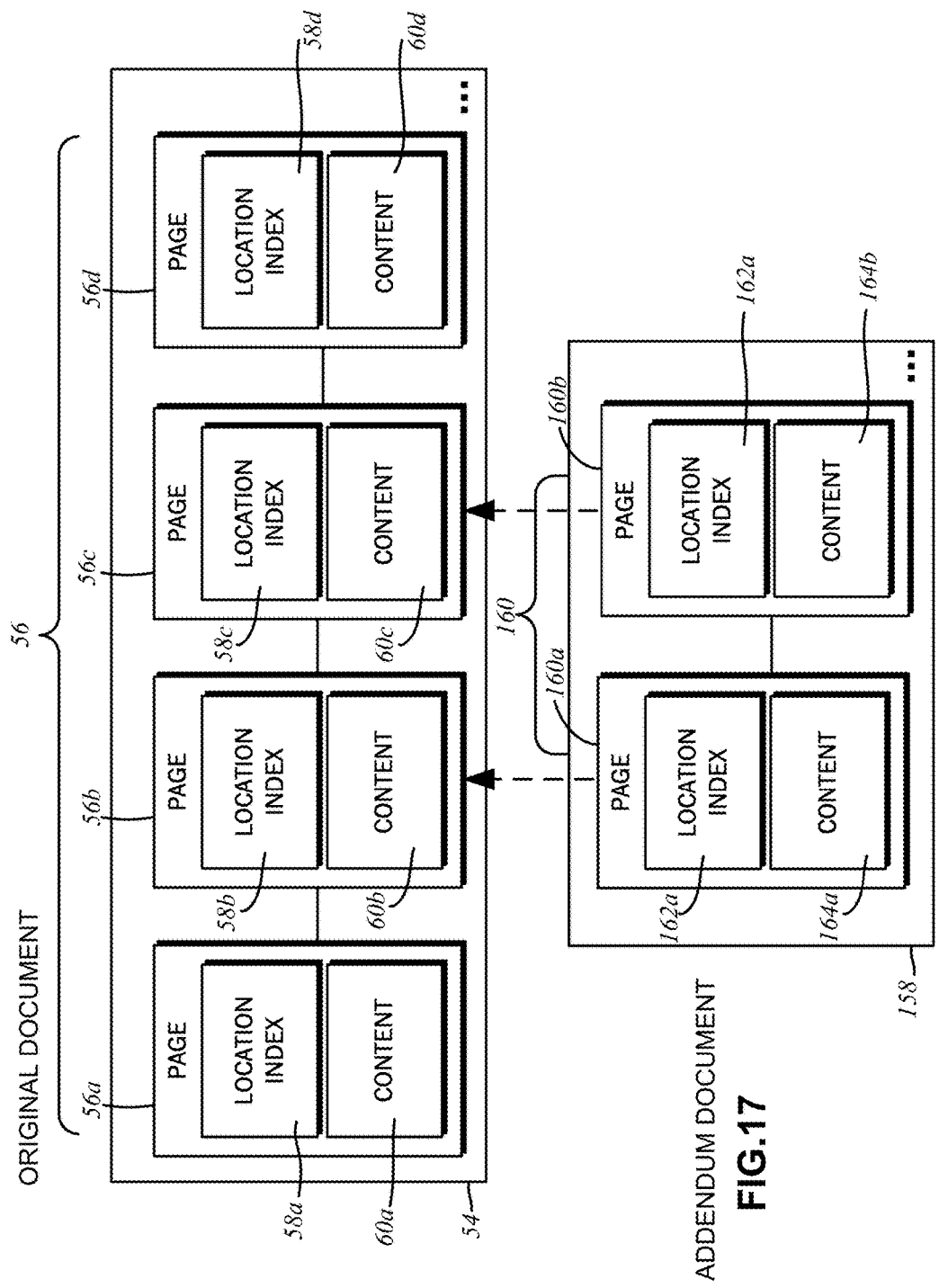
FIG. 17 is a diagram showing an exemplary structure of the original document and the addendum document each including multiple pages each with content and a location index.

FIG. 17 is a symbolic diagram showing an exemplary structure of the original document 54 and the addendum document 158. As discussed above, the original document 54 is comprised of one or more pages 56, such as the first page 56a, the second page 56b, the third page 56c, and the fourth page 56d with additional pages 56, though these are not specifically depicted in the diagram. In this regard, the original document 54 is contemplated to have multiple pages of any quantity. Each of the pages 56 has an associated page location index 58 (individually denoted 58a-d) and page content 60 (individually denoted 60a-d).

Figure 22:
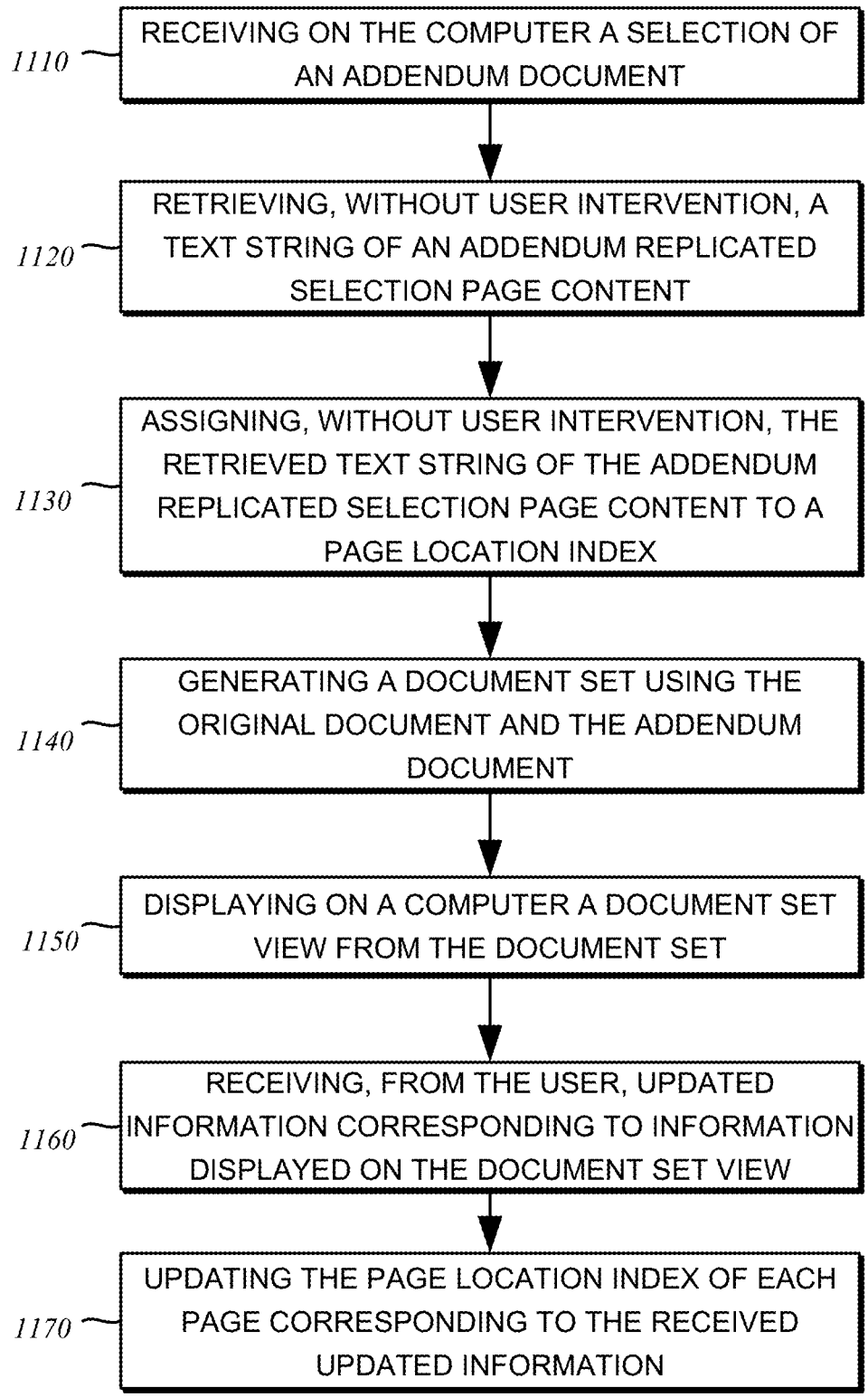
FIG. 22 is a continuation of the flowchart of FIG. 21.

With reference to the flowchart of FIG. 22 the method includes a step 1110 of receiving on the computer a selection of the addendum document 158. The addendum document 158 may include one or more pages 160 (individually denoted 160a and 160b) with additional pages 160, though these are not specifically depicted in the diagram. Each of the pages 160 has an associated page location index 162 (individually denoted 162a-d) and page content 164 (individually denoted 164a-d). Each of the pages 160 of the addendum document 158 has corresponding page content. At least one of the pages 160 of the addendum document 158 being respectively correlated to a page 56 of the original document 54. In this example, page 160a is correlated to page 56b and page 160b is correlated to 56c. In this regard, pages 160a and 160b are revision pages to their counter-part pages 56b and 56c would be superseded.

Figure 18:
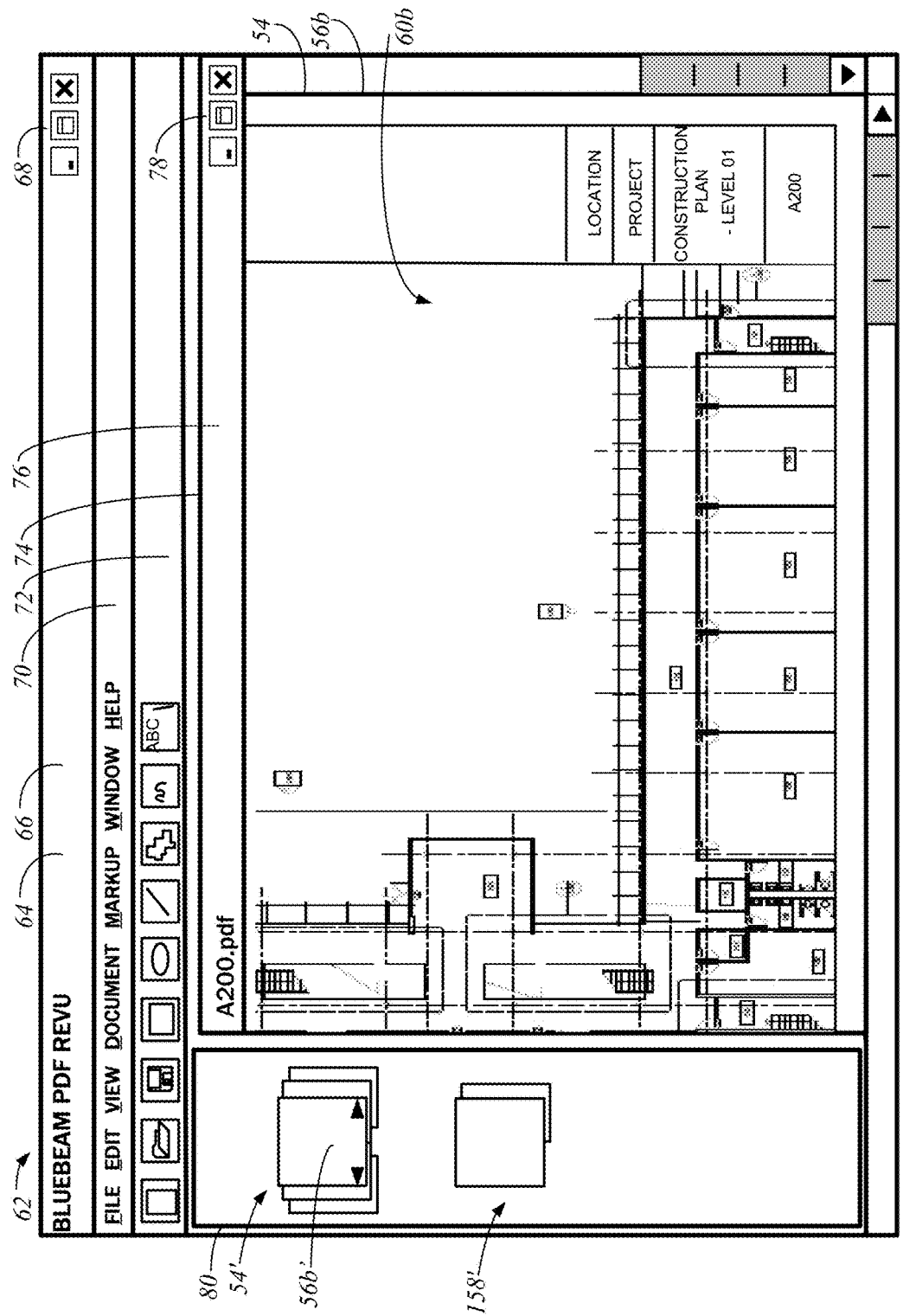
FIG. 18 is the exemplary user interface of FIG. 6 indicating inclusion of the original document and the addendum document in a side-bar window.

FIG. 18 depicts the exemplary user interface 62 of FIG. 6 indicating inclusion of the original document 54 and the addendum document 158 in a thumbnail sidebar 80 as respectively represented by the thumbnail 54' and a thumbnail 158'.

The method includes a step 1120 of retrieving, without user intervention, a text string of an addendum replicated selection page content from each page 160 of the addendum document 158. The addendum replicated selection page content is included in the same first region defined by the set of first boundaries relative to each page 160 of the addendum document 158. The method includes a step 1130 of assigning, without user intervention, the retrieved text string of the addendum replicated selection page content to the page location index 162 of each page of the addendum document 158. In this regard the steps 1120 and 1130 are performed similarly to those steps 1040 and 1050 but rather as applied to the pages 160 of the addendum document 158.

The method includes a step 1140 of generating a document set using the original document 54 and the addendum document 158. In this example the document set consists of the original document 54 and the addendum document 158 and their associated files 52 and 160. The method further includes a step 1150 of displaying on a computer a document set view from the document set. The document set view is generated from document set information based upon the page location index (respectively 58 and 162) of each page (respectively 56 and 160) of the original document 54 and the addendum document 158.

FIG. 19 is the dialog window 132 of FIG. 15 with the inclusion of the addendum document 158 as represented by the associated files 160a and 160b. In this regard, the text strings retrieved in step 1120 is used to populate the page number field under the page number header 138. It is contemplated that other information may be automated in a similar manner to be retrieved from the page content 164 of the addendum document 158 for use in populating the various fields of the document set view window 134.

Having initially presented the user with the various information in the fields of the document set view window, the method includes a step 1160 of receiving, from the user, updated information corresponding to a portion of the document set information displayed on the document set view. As mentioned above, the dialog window 132 includes functionally to edit the fields of the document set view window 134. This allows the user to be presented with the various information that was obtained through the automated portion of the process (i.e., those data retrieval activities conducted without user intervention; although certainly initiated by the user) to be audited and changed if necessary. To this end the method includes a step 1170 of updating the page location index (58 and 162, as applicable) of each page (respectively 56 and 160) of the original document 54 and the addendum document 158 corresponding to the received updated information.

The particulars shown herein are by way of example and for purposes of illustrative discussion of the embodiments of the present disclosure only and are presented in the cause of providing what is believed to be the most useful and readily understood description of the principles and conceptual aspects of the disclosure. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A method of computerized presentation of a document set view, the method comprising:
   receiving, at a computer, a selection of an original document, the original document having multiple pages, each of the multiple pages of the original document having corresponding page content;
   receiving, at the computer, a selection of an addendum document, the addendum document having multiple pages, each of the multiple pages of the addendum document having corresponding page content, at least one page of the addendum document being respectively correlated to a page of the original document;
   receiving, from a user, a selection of a first region within a first page of the original document, the first region being defined by a set of first boundaries relative to the first page and the page content of the first page and including a first base selection page content;
   extracting, without user intervention, a text string of the first base selection page content from the first region within the first page of the original document;
   assigning, without user intervention, the extracted text string of the first base selection page content to a page location index of the first page of the original document;
   determining, without user intervention, a first replicated region within a second page of the original document by applying the set of first boundaries to the second page, the first replicated region including a first replicated selection page content;
   extracting, without user intervention, a text string of the first replicated selection page content from the first replicated region within the second page of the original document, wherein the text string of the first replicated selection page content is the same as or different from the text string of the first base selection page content;

assigning, without user intervention, the extracted text string of the first replicated selection page content to a page location index of the second page of the original document;

determining, without user intervention, a second replicated region within the at least one page of the addendum document by applying the set of first boundaries to the at least one page, the second replicated region including a second replicated selection page content;

extracting, without user intervention, a text string of the second replicated selection page content from the second replicated region within the at least one page of the addendum document, wherein the text string of the second replicated selection page content is the same as or different from the text string of the first replicated selection page content;

assigning, without user intervention, the extracted text string of the second replicated selection page content to a page location index of the at least one page of the addendum document;

generating a document set comprising the original document and the addendum document;

displaying, at the computer, a document set view based on the document set, the document set view being generated from document set information based upon the page location index of each page of the original document and the addendum document;

receiving, from the user, updated information corresponding to a portion of the document set information displayed on the document set view; and updating the page location index of each page of the original document and the addendum document corresponding to the received updated information.

2. The method of claim 1 wherein the text string of the first base selection page content corresponds to a page number.

3. The method of claim 1 wherein the text string of the second replicated selection page content corresponds to a page number.

4. The method of claim 3 wherein the displaying of the document set view includes sorting the document set view based upon one of alphanumeric and numeric values of the page location index of the pages of the original document and the addendum document.

5. The method of claim 1 wherein the extracting of the text string of the first base selection page content is via detection of embedded data from the first page the original document.

6. The method of claim 1 wherein the extracting of the text string of the first base selection page content is via optical character recognition (OCR).

7. The method of claim 1 further including:

receiving, from a user, a selection of a second region within the first page of the original document, the second region being defined by a set of second boundaries relative to the first page and including a second base selection page content;

extracting, without user intervention, a text string of the second base selection page content from the second region within the first page of the original document;

assigning, without user intervention, the extracted text string of the second base selection page content to a page location index of the first page of the original document;

determining, without user intervention, a third replicated region within the second page of the original document by applying the set of second boundaries to the second page, the third replicated region including a third replicated selection page content;

extracting, without user intervention, a text string of the third replicated selection page content from the third replicated region within the second page of the original document; and assigning, without user intervention, the extracted text string of the third replicated selection page content to a page location index of the second page of the original document.

8. The method of claim 7 wherein the text string of the second base selection page content corresponds to a page name.

9. The method of claim 8 wherein the displaying of the document set view includes sorting the document set view based upon one of alphanumeric and numeric values of the page location index of the pages of the original document and the addendum document.

10. The method of claim 1 wherein the displaying of the document set view is in tabular form.

11. The method of claim 1 wherein the displaying of the document set view includes sorting the document set view based upon one of alphanumeric and numeric values of the page location index of the pages of the original document and the addendum document.

12. The method of claim 1 further comprising:

determining a respective replicated region within each page of the original document by applying the set of first boundaries to each page of the original document; and extracting, without user intervention, a text string from the replicated region within each page of the original document.

* * * * *

UNITED STATES PATENT AND TRADEMARK OFFICE
CERTIFICATE OF CORRECTION

| | | |
|---|---|---|
| PATENT NO. | : 10,387,010 B2 | Page 1 of 1 |
| APPLICATION NO. | : 15/431552 | |
| DATED | : August 20, 2019 | |
| INVENTOR(S) | : Joseph W. Wezorek and Elliot Chenault | |

It is certified that error appears in the above-identified patent and that said Letters Patent is hereby corrected as shown below:

In the Claims

In Claim 5, Column 15, Lines 49-50, delete "the first page the original document" and insert --the first page of the original document--.

Signed and Sealed this
First Day of October, 2019

Andrei Iancu
*Director of the United States Patent and Trademark Office*